(12) United States Patent
Yang

(10) Patent No.: US 7,663,711 B2
(45) Date of Patent: Feb. 16, 2010

(54) LIQUID CRYSTAL DISPLAY AND METHODS OF FABRICATING AND REPAIRING THE SAME

(75) Inventor: Byung Duk Yang, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 324 days.

(21) Appl. No.: 11/633,723

(22) Filed: Dec. 5, 2006

(65) Prior Publication Data
US 2007/0159571 A1    Jul. 12, 2007

(30) Foreign Application Priority Data
Jan. 11, 2006    (KR)    ........................ 10-2006-0003234

(51) Int. Cl.
*G02F 1/1333*    (2006.01)
(52) U.S. Cl. ............................. 349/54; 349/43; 349/38; 349/187; 257/72
(58) Field of Classification Search .................... 349/54, 349/43, 38, 187; 257/72
See application file for complete search history.

(56) References Cited
U.S. PATENT DOCUMENTS
6,753,935 B2 *    6/2004    Wu ............................. 349/54

\* cited by examiner

*Primary Examiner*—Thoi V Duong
(74) *Attorney, Agent, or Firm*—F. Chau & Associates, LLC

(57) ABSTRACT

A liquid crystal display comprising first and second switching elements connected to a first signal line; a signal line pair including a second and a third signal line connected to the first and second switching elements, respectively; a first pixel pattern connected through a first connection terminal of the first switching element; a second pixel pattern connected through a second connection terminal of the second switching element; a storage electrode line overlapping with the first and second pixel patterns; and a repair portion for electrically connecting the first and second pixel patterns to each other through a repairing process.

28 Claims, 19 Drawing Sheets

LIQUID CRYSTAL DISPLAY AND METHODS OF FABRICATING AND REPAIRING THE SAME

CROSS-REFERENCE TO RELATED PATENT APPLICATION

This application claims priority to Korean Patent Application No. 2006-0003234, filed on Jan. 11, 2006, in the Korean Intellectual Property Office, the disclosure of which is incorporated by reference herein.

BACKGROUND OF THE INVENTION

1. Technical Field

The present disclosure relates to a liquid crystal display, and methods of fabricating and repairing the same, and more particularly, to a method of repairing a liquid crystal display with two sub-pixels in one pixel.

2. Discussion of the Related Art

Since a liquid crystal display (LCD) has advantages of small size, light weight and low power consumption as compared to a conventional cathode ray tube (CRT), the LCDs are widely favored over the CRTs.

An LCD is a device in which two substrates with electrodes formed thereon are positioned such that the two electrodes face each other, a liquid crystal substance is injected between the two substrates, and an electric field is then applied between the two electrodes to move liquid crystal molecules so that transmittance of light can vary, thereby displaying an image. A conventional LCD has a narrow viewing angle due to gray inversion generated from all liquid crystals of the LCD being oriented in one direction. Accordingly, studies on a technique for increasing the viewing angle of the LCD have been actively conducted in recent years.

A patterned vertical alignment (PVA) type LCD has been developed to improve the viewing angle of an LCD. Liquid crystals within the PVA type LCD are vertically aligned with respect to upper and lower substrates, and an aperture pattern, a protrusion pattern or the like is formed as a domain regulating means on a pixel electrode and a common electrode that is a counter electrode. However, a side visibility distortion phenomenon occurs in the conventional PVA type LCD.

An LCD provided with an S-PVA structure has been developed in response to the phenomenon. A unit pixel is constructed to have two sub-pixels and differential voltages are applied to the respective sub-pixels so that side gray level rounding or reversion can be relieved, thereby enhancing side visibility. Such an LCD comprises two transistors and two pixel electrode patterns within a region of one pixel for expressing one color, and naturally expresses gray levels using a method of differentiating peak voltages applied to the respective pixel electrode patterns so that the side visibility distortion phenomenon can be relieved.

However, where one of two sub-pixels constituting one pixel has a failure in a conventional S-PVA structure, the other sub-pixel should also be repaired. This complicates the repairing process and thus lowers the rate of a successful pixel repair.

S-PVA structures include a structure in which two thin film transistors (TFTs) driven through different gate lines share one data line and a structure in which two TFTs connected to different data lines share one gate line.

FIG. 1 illustrates a method of repairing a conventional LCD.

Referring to FIG. 1, the conventional LCD comprises first and second TFTs 21 and 22 connected to gate lines 10, first and second data lines 31 and 32 respectively connected to the first and second TFTs 21 and 22, first pixel patterns 41 connected to the first TFTs 21, second pixel patterns 42 connected to the second TFTs 22 and storage electrodes 50 overlapping with the first and second pixel patterns 41 and 42.

A protection film is formed on the first and second TFTs 21 and 22, and the first and second pixel patterns 41 and 42 are formed on the protection film.

The first TFT 21 is connected to the first pixel pattern 41 through a first drain contact plug 43, and the second TFT 22 is connected to the second pixel pattern 42 through a second drain contact plug 44. Further, the storage electrode 50 extends below the first and second drain contact plugs 43 and 44.

Accordingly, there is provided an LCD including a first sub-pixel with a first pixel pattern and a second sub-pixel with a second pixel pattern within a region of one pixel. Here, a gray level voltage with a lower peak value is applied to the first sub-pixel to express a lower gray level, and a gray level voltage with a higher peak value is applied to the second sub-pixel to express a higher gray level.

However, since two pixel patterns are provided within the region of one pixel and two TFTs for respectively driving them are included in the structure, a channel failure generating rate of the TFTs due to contaminations is twice that of a case where one TFT is provided for one pixel pattern. Further, the number of lines for use in driving a plurality of pixel patterns increases, and accordingly, a failure rate increases due to an increase in pattern density.

Furthermore, since the two sub-pixels constitute one pixel, when a failure occurs in one of the two sub-pixels, both the sub-pixels need to be repaired.

A pixel failure can be repaired by disconnecting the TFTs of the pixel from the corresponding pixel patterns. The first TFT 21 can be disconnected from the first pixel pattern 41 by using a laser to cut a region (see region B in FIG. 1) on an extension of the drain electrode 28 between the first TFT 21 and the first drain contact plug 43.

The first pixel pattern 41 and the lower storage electrode 50 are electrically connected by radiating a laser such that the first pixel pattern 41 is not floated and is off upon application of a storage voltage. If the first pixel pattern 41 is floated, a liquid crystal is driven by a voltage applied to a common electrode pattern (not shown). Thus, a storage voltage at the same level as the voltage applied to the common electrode pattern is applied to the first pixel pattern so that a sub-pixel including the first pixel pattern 41 becomes an off-pixel. To prevent the first pixel pattern 41 from being floated due to a connection failure, the laser is radiated twice at both edges of the first drain contact plug 43 (see regions C and D in FIG. 1). Accordingly, the sub-pixel including the first pixel pattern 41 is off.

Since the entire unit pixel becomes a low pixel if one sub-pixel is off, the entire unit pixel should become an off-pixel. Thus, an extension of the drain electrode 28 between the second TFT 22 and the second drain contact plug 44 should be cut using the laser so that the second TFT 22 can be disconnected from the second pixel pattern 42 (see region G in FIG. 1). The second pixel pattern 42 and the storage electrode 50 are electrically connected by radiating a laser twice at both edges of the contact plug 44 (see regions E and F in FIG. 1). Accordingly, the other sub-pixel including the second pixel pattern 42 is also off.

As described above, it requires six laser operations to repair the conventional LCD. Therefore, a need exists for a more efficient method of repairing an LCD.

SUMMARY OF THE INVENTION

An exemplary embodiment of the present invention provides a liquid crystal display (LCD) comprising first and second switching elements connected to a first signal line, a signal line pair including a second and a third signal line connected to the first and second switching elements, respectively, a first pixel pattern connected through a first connection terminal of the first switching element, a second pixel pattern connected through a second connection terminal of the second switching element, a storage electrode line overlapping with the first and second pixel patterns, and a repair portion for electrically connecting the first and second pixel patterns to each other through a repairing process.

The repair portion may comprise a repair line partially overlapping with the first and second connection terminals, respectively, and a repair electrode overlapping with the repair line and any one of the first and second pixel patterns.

The repair line may be formed to take the shape of a straight line extending in the same direction as the storage electrode line, and overlap with the first and second connection terminals at both ends of the straight line. The repair line may be formed on the same plane as the storage electrode line and insulated from the first and second connection terminals by a first insulation film. The repair line may be provided between the first signal line and the storage electrode line.

The repair electrode may be formed to take the shape of a plate that partially overlaps with the storage electrode line and also overlaps with the repair line at one end of the plate. The repair electrode may be formed on the same plane as the first and second connection terminals, and the repair electrode may be insulated from the storage electrode line and the repair line by the first insulation film and from the overlapped pixel pattern by a second insulation film. The LCD may further comprise first and second repair pads provided in the overlapped regions of the repair line with the first and second connection terminals, respectively, and a third repair pad provided in the overlapped region of the repair line with the repair electrode.

The first connection terminal may include a first contact pad provided on the storage electrode line to connect the first pixel pattern, and the second connection terminal includes a second contact pad provided on the storage electrode line to connect to the second pixel pattern, and the repair electrode may be provided at a region between the first and second contact pads. The first and second connection terminals may extend in the same direction.

A peak value of a voltage applied to the second signal line is lower than or substantially identical to that of a voltage applied to the third signal line.

An exemplary embodiment of the invention provides a method of fabricating an LCD, comprising the steps of forming a first signal line, a storage electrode line and a repair line; forming first and second switching elements connected to the signal line; forming a signal line pair including a second and a third signal line connected to the first and second switching elements respectively; forming first and second connection terminals on the first and second switching elements respectively; forming a repair electrode that partially overlaps with the repair line; forming a first insulation layer to insulate the repair line from the first and second connection terminals; forming a second insulation film; and forming first and second pixel patterns to connect to the first and second connection terminals through the second insulation film, respectively, and to partially overlap with the storage electrode line, and to cause any one of the first and second pixel patterns to overlap with the repair electrode.

The method may further comprise the step of forming an active layer on the first and second connection terminals and forming a repair pad on at least a portion of the repair line.

Each of the first and second connection terminals may be formed to partially overlap with the repair line. The repair electrode is preferably formed to partially overlap with the storage electrode line. The first and second connection terminals may include first and second contact pads connected to the first and second pixel patterns, respectively, and the first and second contact pads are formed on the storage electrode line. The repair electrode may be formed at a region between the first and second pads.

An exemplary embodiment of the present invention provides a method of repairing an LCD including first and second switching elements connected to a first signal line, a signal line pair including a second and a third signal line connected to the first and second switching elements, respectively, a first pixel pattern connected through a first connection terminal of the first switching element, a second pixel pattern connected through a second connection terminal of the second switching element, a storage electrode line overlapping with the first and second pixel patterns, a repair line partially overlapping with the first and second connection terminals, respectively, and a repair electrode overlapping with the repair line and any one of the first and second pixel patterns. The method further comprises the steps of cutting any one of the first and second connection terminals to form a cut connection terminal and an uncut connection terminal; connecting the uncut connection terminal to the repair line; and connecting the repair electrode and one of the first and second pixel patterns which had been connected to the cut connection terminal, to the repair line.

The repair line may be provided between the first signal line and the storage electrode line, first and second connection lines may extend from the first and second switching elements to an upper side of the storage electrode line, and cutting any one of the first and second connection terminals may comprise using a laser beam to radiate onto a region between the repair line and the first signal line.

At least any one of the first and second pixel patterns may include a aperture pattern, and the cut connection terminal may be cut in the aperture pattern between the first and second pixel patterns.

A laser beam may be radiated onto an overlapped region of the uncut connection terminal with the repair line and an overlapped region of the repair electrode with the repair line, so that the uncut connection terminal, the repair line and the repair electrode in the overlapped region can be connected to one another. A laser beam may be radiated onto an overlapped region of the cut connection terminal with the repair line, so that the pixel pattern connected to the cut connection terminal can be connected to the repair line.

If a failure occurs in a region of the first switching element and the first pixel pattern overlaps with the repair electrode, the first connection terminal may be cut, the second connection terminal may be connected to the repair line, and the repair electrode may be connected to the repair line. If a failure occurs in a region of the second switching element and the first pixel pattern overlaps with the repair electrode, the second connection terminal may be cut, and the first and second connection terminals may be connected to the repair line.

An exemplary embodiment of the present invention provides a thin film transistor (TFT) substrate comprising first and second TFTs formed in a pixel region; a gate line connected to the first and second TFTs; first and second data lines connected to the first and second TFTs, respectively; first and second drain electrodes for connecting the first and second TFTs to first and second pixel patterns, respectively; a repair line partially overlapping with the first and second drain electrodes; and a repair electrode overlapping with the repair line and any one of the first and second pixel patterns.

The repair line may be formed on the same plane as the gate line and insulated from the first and second drain electrodes by a gate insulation film.

The TFT substrate may further comprise a storage electrode line overlapping with the first and second pixel patterns and formed on the same plane as the gate line. The repair line may be provided between the storage electrode line and the gate line. At this time, the repair electrode may be formed to take the shape of a plate that partially overlaps with the storage electrode line.

The repair electrode may be formed on the same plane as the first and second drain electrodes, and the repair electrode may be insulated from the repair line by the gate insulation film and from the overlapped pixel pattern by a TFT protection film.

The TFT substrate may further comprise first and second repair pads provided at overlapping regions of the first and second drain electrodes with the repair line, respectively, and a third repair pad provided at an overlapping region of the repair electrode with the repair line.

BRIEF DESCRIPTION OF THE DRAWINGS

The above and other features of the present invention will become apparent by describing in detail exemplar embodiments thereof with reference to the attached drawings, in which.

DETAILED DESCRIPTION OF EXEMPLARY EMBODIMENTS

Figure 1:
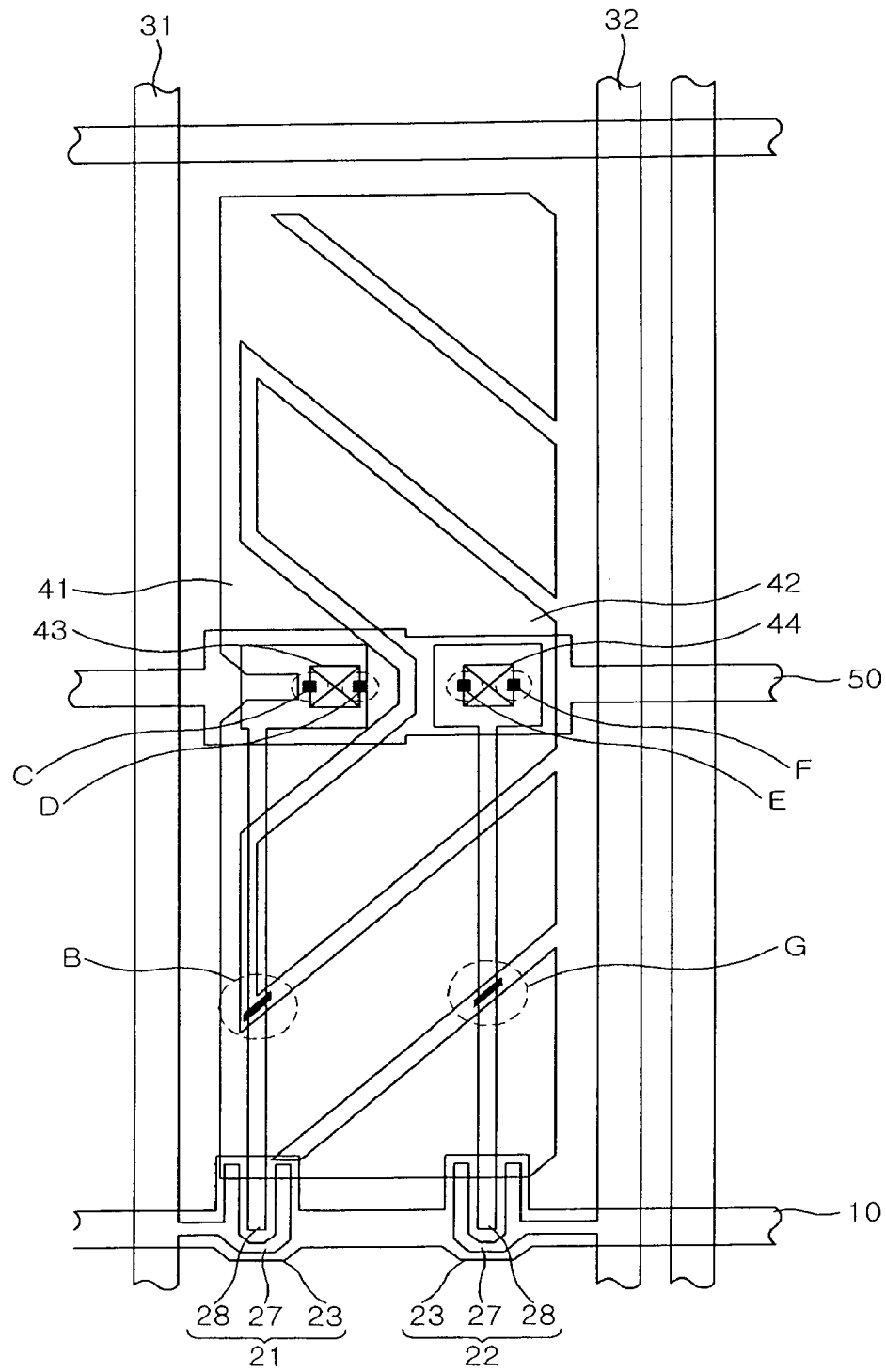
FIG. 1 is a plan view illustrating a problem in a repairing method of a conventional liquid crystal display (LCD)

Hereinafter, exemplary embodiments of the present invention will be described in detail with reference to the accompanying drawings. In the drawings, the thicknesses of layers and regions are exaggerated for clarity, and like reference numerals are used to designate like elements throughout the specification and drawings. Further, an expression that an element such as a layer, region, substrate or plate is placed on or above another element indicates not only a case where the element is placed directly on or just above the other element but also a case where a further element is interposed between the element and the other element.

Figure 2:
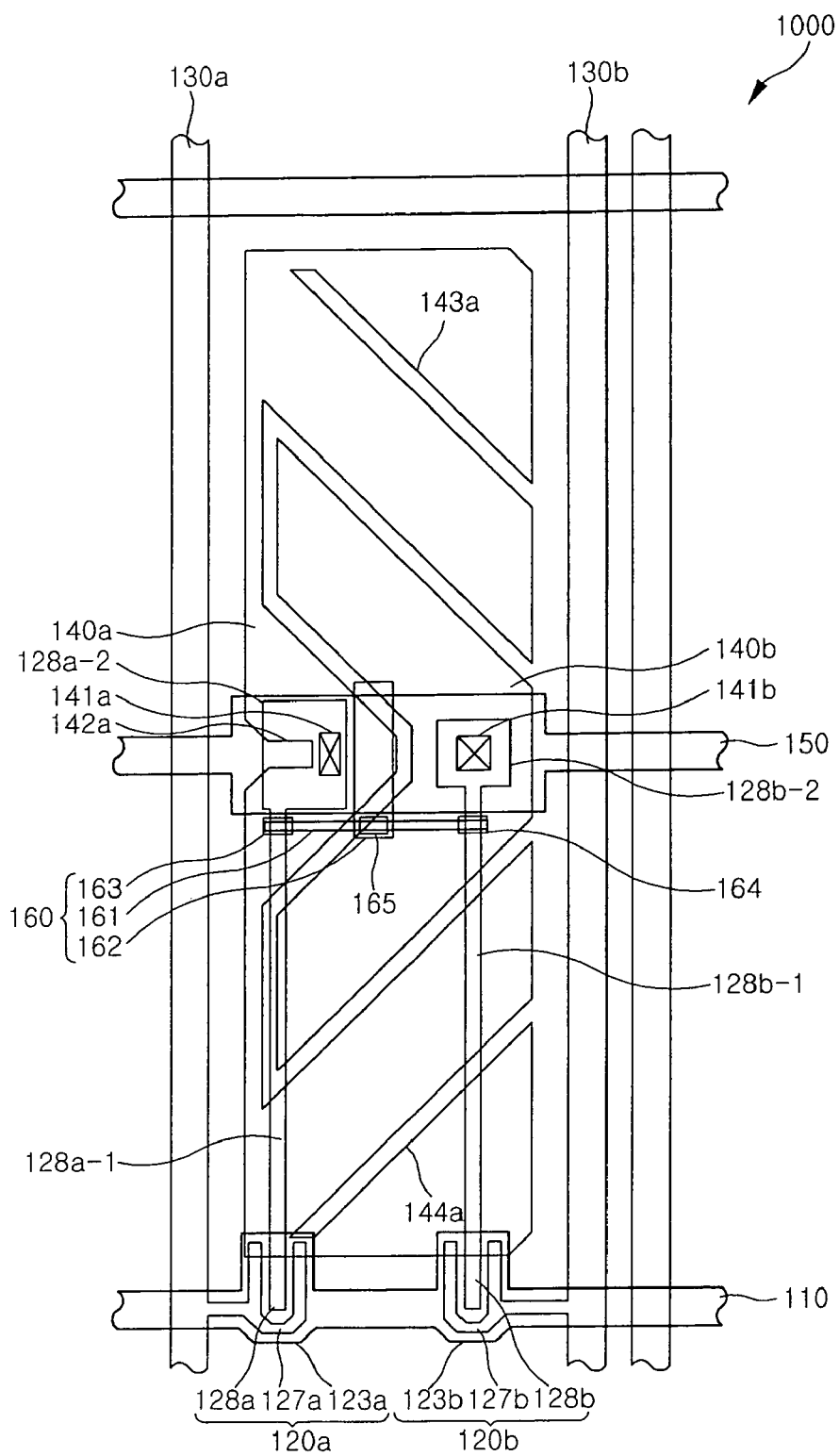
FIG. 2 is plan view of a thin film transistor (TFT) substrate according to an exemplary embodiment of the present invention.
Figure 3:
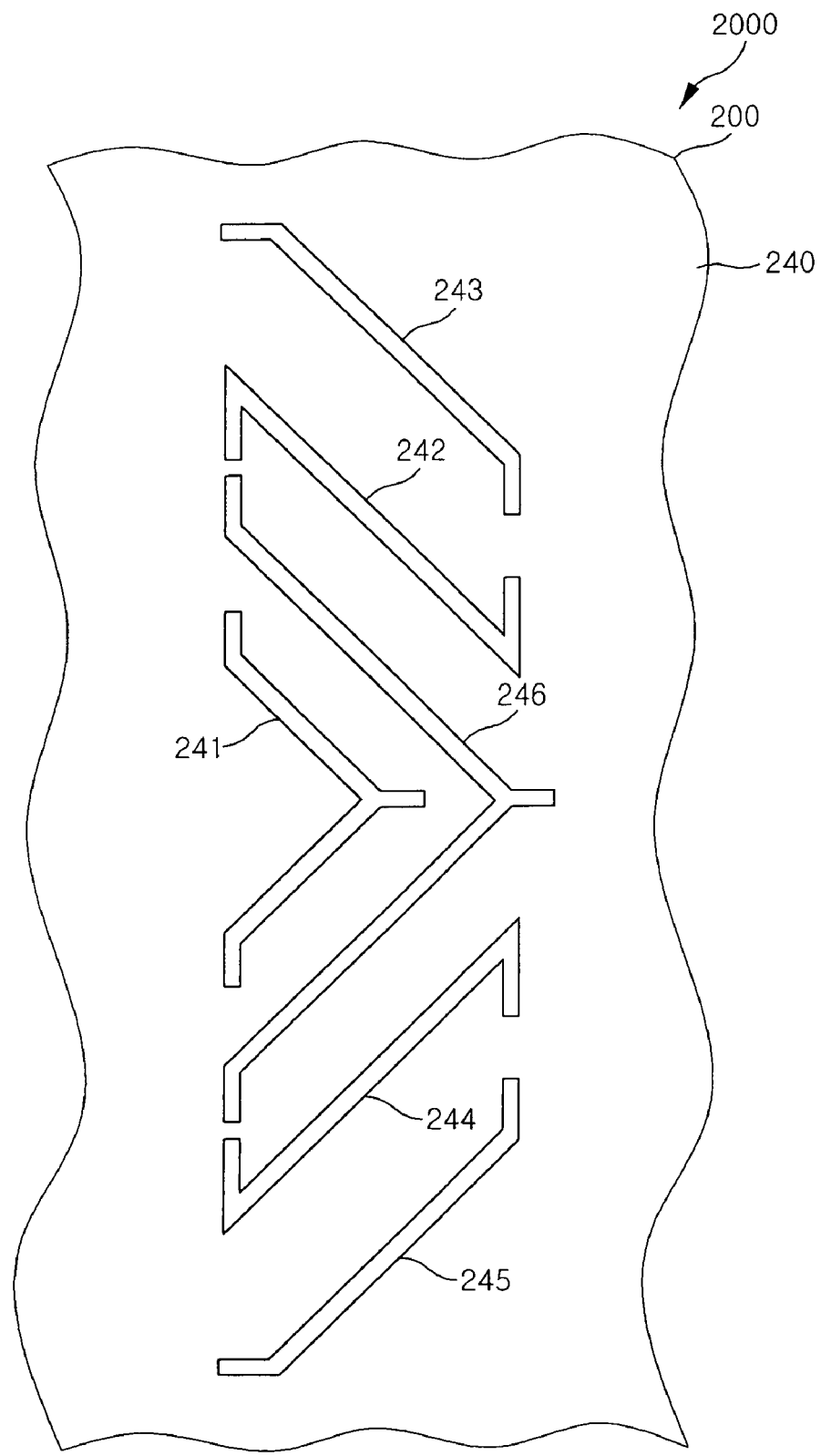
FIG. 3 is a plan view of a color filter substrate according an exemplary embodiment of the present invention.
Figure 4:
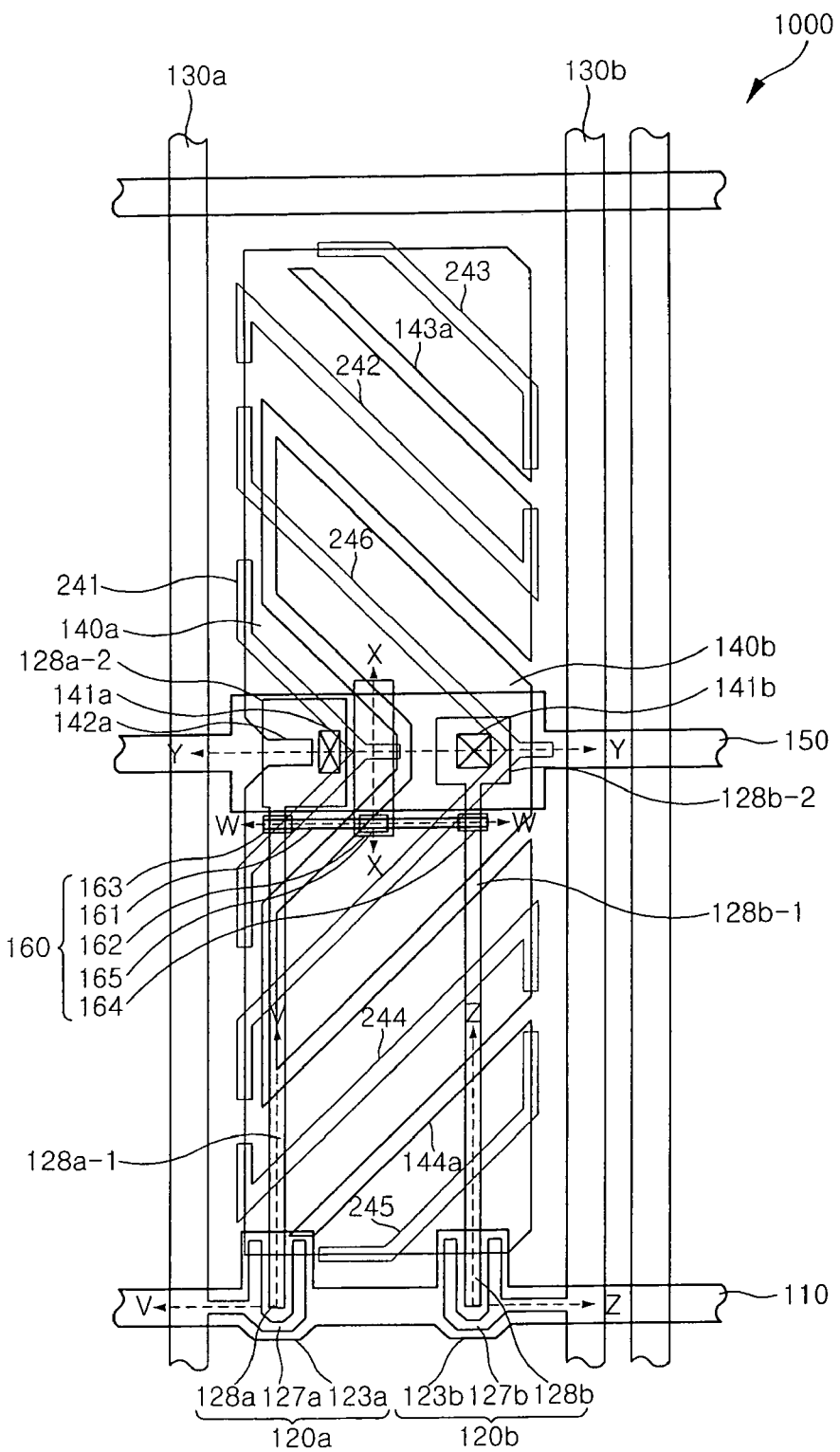
FIG. 4 is a plan view of an LCD in which the TFT substrate of FIG. 2 and the color filter substrate of FIG. 3 are combined, according to an exemplary embodiment of the present invention.
Figure 5:
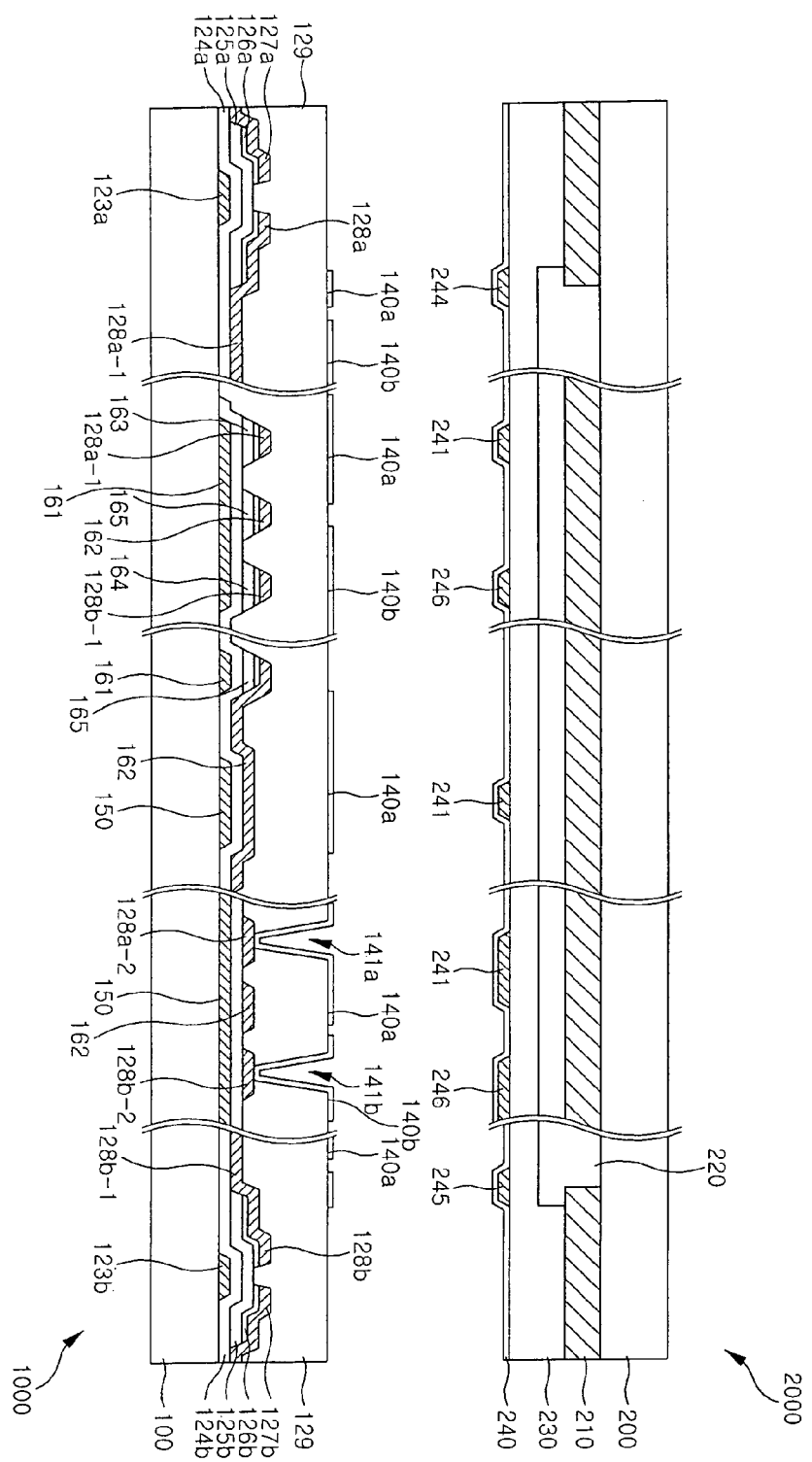
FIG. 5 shows sectional views of the LCD taken along lines V-V, W-W, X-X, Y-Y and Z-Z in FIG. 4.

FIG. 2 is plan view of a thin film transistor (TFT) substrate according to an embodiment of the present invention. FIG. 3 is a plan view of a color filter substrate according to an exemplary embodiment of the present invention. FIG. 4 is a plan view of an LCD in which the TFT substrate of FIG. 2 and the color filter substrate of FIG. 3 are combined, according to an exemplary embodiment of the present invention. FIG. 5 shows sectional views of the LCD taken along lines V-V, W-W, X-X, Y-Y and Z-Z in FIG. 4.

Referring to FIGS. 2 to 5, an LCD according to an exemplary embodiment of the invention comprises a TFT substrate 1000 that is a lower substrate, a common electrode substrate 2000 that is an upper substrate positioned to face the TFT substrate 1000, and a liquid crystal layer (not shown) that is formed between the two substrates and oriented in a desired direction with respect to the substrates.

An alignment film for orienting liquid crystals is mounted on surfaces of the upper and lower substrates to orient liquid crystal molecules of the liquid crystal layer. The liquid crystal molecules of the liquid crystal layer may be oriented in a vertical alignment mode to be perpendicular to the respective substrates.

The TFT substrate 1000 comprises a plurality of gate lines 110 extending in a first direction and arranged at predetermined intervals in a second direction on a transparent insulative substrate 100 to transmit gate signals; a plurality of first and second data lines 130a and 130b formed to intersect the gate lines 110; first and second pixel patterns 140a and 140b formed in pixel regions defined by the gate lines 110 and the first and second data lines 130a and 130b; first TFTs 120a each of which is connected to one of the first pixel patterns 140a, one of the first data lines 130a and one of the gate lines 110; second TFTs 120b each of which is connected to one of the second pixel patterns 140b, one of the second data lines 130b and one of the gate lines 110; storage electrode lines 150 extending in parallel with the gate lines 110 to pass through the first and second pixel patterns 140a and 140b; and repair portions 160 that can connect the first and second pixel patterns 140a and 140b to each other through a repairing process.

A pixel region defined by the area surrounded by two adjacent gate lines 110 and a pair of first and second data lines 130a and 130b may have a rectangular shape in its layout.

The gate lines 110 generally extend in a lateral direction, and portions of each of the gate lines 110 protrude upward and/or downward to establish gate electrodes 123a and 123b of the first and second TFTs 120a and 120b. A gate pad (not shown) for connection with an external circuit is formed at an end of each of the gate lines 110.

The first and second data lines 130a and 130b generally extend in a longitudinal direction and are positioned at both sides of the first and second pixel patterns 140a and 140b, respectively. Further, portions of the first and second data lines 130a and 130b protrude to form source electrodes 127a and 127b of the first and second TFTs 120a and 120b, respectively. A data pad (not shown) is formed at an end of each of the first and second data lines 130a and 130b. Although the first and second data lines 130a and 130b have been illustrated herein as having a straight shape, each of the first and second data lines 130a and 130b may have curved regions. When the lines 130a and 130b have curved regions, the first and second pixel electrodes 140a and 140b may be formed along the curved regions of the data lines 130a and 130b.

The storage electrode line 150 is formed to be in the same layer as the gate lines 110 and to extend in the same direction as the gate lines, and is positioned at the center of the pixel region as shown in FIGS. 2 an 4. Further, a common voltage (Vcom) may be applied to an end of the storage electrode line 150. As shown in FIGS. 2 and 4, the width of the storage electrode line 150 formed in a region where it overlaps with the first and second pixel patterns 140a and 140b may be formed larger than that of the storage electrode line 150 formed in other regions. The storage electrode line 150 overlaps with the first and second pixel patterns 140a and 140b to form first and second storage capacitors, and an overlapping area of the storage electrode line 150 and the first and second pixel patterns 140a and 140b may be adjusted to control capacitances of the first and second storage capacitors. Further, first and second contact pads 128a-2 and 128b-2, respectively connected to the first and second pixel patterns 140a and 140b, are provided between the storage electrode line 150 and the first and second pixel patterns 140a and 140b to increase the capacitances of the first and second storage capacitors. Areas where the storage electrode line 150 respectively overlaps with the first and second pixel patterns 140a and 140b may be substantially identical to each other and/or areas where the storage electrode line 150 respectively overlaps with the first and second contact pads 128a-2 and 128b-2 may be substantially identical to each other.

Further, the first and second TFTs 120a and 120b comprise gate electrodes 123a and 123b, source electrodes 127a and 127b, and drain electrodes 128a and 128b, respectively. The aforementioned first and second TFTs 120a and 120b allow first and second pixel signals (gray level voltages) supplied to the first and second data lines 130a and 130b to be charged into the first and second pixel patterns 140a and 140b in response to a signal supplied to the gate line 110, respectively. To this end, the gate electrodes 123a and 123b are connected to the gate line 110, the source electrodes 127a and 127b are connected to the data lines 130a and 130b, and the drain electrodes 128a and 128b are connected to the pixel patterns 140a and 140b. Further, the first and second TFTs 120a and 120b include gate insulation films 124a and 124b, active layers 125a and 125b, and ohmic contact layers 126a and 126b formed on at least portions of the active layers 125a and 125b, all of which are sequentially formed between the gate electrodes 123a and 123b, the source electrodes 127a and 127b, and the drain electrodes 128a and 128b, respectively. The ohmic contact layers 126a and 126b may be formed on the active layers 125a and 125b respectively, but not channel portions.

The source electrode 127a of the first TFT 120a is connected to the first data line 130a, and the drain electrode 128a is connected to the first pixel pattern 140a through the first contact pad 128a-2 extending from the drain electrode 128a. The source electrode 128b of the second TFT 120 is connected to the second data line 130b, and the drain electrode 128b is connected to the second pixel pattern 140b through the second contact pad 128b-2 extending from the drain electrode 128a.

The first contact pad 128a-2 may be connected to an extension line 128a-1 extending from the drain electrode 128a of the first TFT 120a and provided in a region between the storage electrode line 150 and the first pixel pattern 140a. Further, the second contact pad 128b-2 may be connected to an extension line 128b-1 extending from the drain electrode 128b of the second TFT 120b and provided in a region between the storage electrode line 150 and the second pixel pattern 140b.

The first and second contact pads 128a-2 and 128b-2 may serve as bridges of the first and second pixel patterns 140a and 140b, and thus, may function to control the capacitances of the first and second storage capacitors formed between the first and second pixel patterns 140a and 140b and the storage electrode line 150, respectively.

An insulative protection film 129 is formed on each of the first and second TFTs 120a and 120b. The protection film 129 may be made of an inorganic substance such as silicone nitride, silicone oxide or the like, or formed of an organic film with a low dielectric constant. It will be understood that the protection film 129 may be formed as a double layer of an inorganic insulation film and an organic film.

A portion of the protection film 129 is patterned to form first and second contact plugs 141a and 141b for respectively exposing portions of the first and second contact pads 128a-2 and 128b-2. The first contact pad 128a-2 and the first pixel pattern 140a are electrically connected to each other through the first contact plug 141a, and the second contact pad 128b-2 and the second pixel pattern 140b are electrically connected to each other through the second contact plug 141b.

The first and second pixel patterns 140a and 140b are formed on the protection film 129 and are connected to the drain electrodes 128a and 128b of the first and second TFTs 120a and 120b through the first and second contact plugs 141a and 141b and the first and second contact pads 128a-2 and 128b-2, respectively.

As shown FIGS. 2 and 4, the second pixel pattern 140b is the shape of V extending to the right and left from a central portion thereof. The first pixel pattern 140a is shaped to surround the V-shaped second pixel pattern 140b. The first pixel pattern 140a comprises the central portion provided at the center of the V-shape, and upper and lower portions respectively provided at upper and lower sides thereof. The first and second pixel patterns 140a and 140b may have a plurality of aperture patterns as domain regulating means for controlling the alignment direction of liquid crystals. A plurality of aperture patterns 142a, 143a and 144a may be formed in the first pixel pattern 140a. The first aperture pattern 142a extends inward from a left edge of the central portion of the first pixel pattern 140a, and a left edge side of the first aperture pattern, where an entrance thereof, is flared. The second aperture pattern 143a diagonally extends upward from a right edge of an upper portion of the first pixel pattern 140a, and the third aperture pattern 144a diagonally extends downward from a right edge of a lower portion of the first pixel pattern 140a. The second and third aperture patterns 143a and 144a may make a right angle therebetween. Further, the regions which have been cut to form the first and second pixel patterns 140a and 140b, may also make a right angle therebetween. Protrusion patterns rather than the aperture patterns may be formed as the domain regulating means for controlling the alignment direction of liquid crystals.

The repair portion 160 comprises a repair line 161 that partially overlaps with the respective drain electrodes 128a and 128b of the first and second TFTs 120a and 120b, and a repair electrode 162 that partially overlaps with the repair line 161 and the first pixel pattern 140a. Further, the repair portion 160 comprises first and second repair pads 163 and 164 provided at regions where the repair line 161 overlaps with the drain electrodes 128a and 128b of the first and second TFTs 120a and 120b, respectively; and a third repair pad 165 provided at a region where the repair line 161 overlaps with the repair electrode 162.

The repair line 161 may be formed on the same plane as the gate line 110 and the storage electrode line 150. The repair line may be provided at a region between the gate line 110 to which the first and second TFTs are connected and the storage electrode line 150. As shown in FIGS. 2 and 4, the repair line 161 may extend in the same direction as the gate line 110 and the storage electrode line 150. The repair line 161 may be formed close to the storage electrode line 150. The repair line 161 may be formed at end portions of the extension lines 128a-1 and 128b-1 of the drain electrodes 128a and 128b to minimize a decrease in aperture ratio. Since the repair line 161 functions to connect the drain electrodes 128a and 128b or the repair electrode 162, which passes above the repair line 161, through a subsequent repairing process, the repair line may be formed to have a width enabling connection with the drain electrodes 128a and 128b when the repairing process is performed using a laser. The width of the repair line 161 may be formed to be substantially identical to that of the extension lines 128a-1 and 128b-1 of the drain electrodes 128a and 128b. However, the width of the repair line may be formed to be larger or smaller than that of the extension lines 128a-1 and 128b-1.

The repair electrode 162 may be formed on the same plane as the first and second contact pads 128a-2 and 128b-2. The repair electrode 162 may partially overlap with the storage electrode line 150 and the repair line 161 at a lower side of the repair electrode 162, and with the first pixel pattern 140a at an upper side of the repair electrode 162. Formation of the repair electrode 162 such that it partially overlaps with the storage electrode line 150 decreases an aperture ratio of the LCD. The repair electrode 162 may be made in the form of an isolated plate between the first and second contact pads 128a-2 and 128b-2 as shown in FIGS. 2 and 4. The repair electrode 162 is insulated from the storage electrode line 150 and the repair line 161 by means of the gate insulation films 124a and 124b, and from the first pixel pattern 140a by means of the protection film 129.

Although the repair electrode 162 has been described as overlapping with the first pixel pattern 140a above, it is not limited thereto, but may overlap with the second pixel pattern 140b. Further, although the repair electrode 162 has been described as being formed to take the shape of a single plate, it is not limited thereto, but may be formed in a variety of patterns and forms. For example, the repair electrode 162 may be made in the form of teeth of a comb so that an overlapping area of the repair electrode 162 with the first pixel pattern 140a can be adjusted through cutting of teeth in the comb-shaped repair electrode. Further, the repair electrode 162 may be formed of a plurality of patterns.

The first to third repair pads 163, 164 and 165 may be formed on the same plane as the active layers 125a and 125b of the first and second TFTs 120a and 120b. Accordingly, electrical contact between the lower repair line 161, and the upper drain electrodes 128a and 128b and repair electrode 162 can be improved through the first to third repair pads 163, 164 and 165 in a repair process. It is to be understood that the first to third repair pads 163, 164 and 165 may be omitted.

According to an exemplary embodiment of the invention, referring to FIG. 3, a common electrode substrate 2000, a black matrix 210 for preventing light leakage and light interference between adjacent pixel regions, and red, green and blue color filters 220 are formed on a bottom surface of an insulative substrate 200 made of a transparent insulative material such as glass. An overcoat film 230 made of an organic material is formed below the color filters 220. A common electrode 240 made of a transparent conductive material such as ITO or IZO is formed beneath the overcoat film 230. The common electrode 240 includes a aperture or protrusion pattern. A plurality of aperture patterns 241, 242, 243, 244, 245 and 246 are provided at positions where the first and second pixel pattern 140a or 140b are divided into two parts.

The aperture patterns 142a, 143a and 144a of the first and second pixel patterns 140a and 140b, and the aperture patterns 241, 242, 243, 244, 245 and 246 serve as domain regulating means for the divided alignment of liquid crystal molecules. Such domain regulating means may be mounted only at least any one of the first and second pixel patterns 140a and 140b and the common electrode 240.

In an exemplary embodiment of the present invention, the TFT substrate 1000 and the common electrode substrate 2000 are combined with each other, and the liquid crystal layer is provided therebetween. This provides a basic panel of the LCD, which has the first and second sub-pixels within the unit pixel, and the repair portion for use in repairing the LCD when a failure occurs in the sub-pixels. The LCD may be provided with liquid crystals having a negative type dielectric constant anisotropy between the upper and lower substrates so that the liquid crystals are vertically oriented. In the LCD of FIGS. 2 to 5, components such as a polarizer, a backlight and a compensation plate, which are not shown in the figures, may be arranged at both sides of such a basic panel.

If a voltage is applied to the LCD, the first and second pixel patterns 140a and 140b receive first and second gray scale signals supplied from the first and second TFTs 120a and 120b connected to the first and second pixel patterns 140a and 140b, respectively, so that they generate a potential difference from the common electrode 240 formed on the common electrode substrate 2000.

Due to the potential difference, the liquid crystals positioned between the TFT substrate 1000 and the common electrode substrate 2000 are rotated by means of the dielectric anisotropy, and the amount of light incident from a light source (not shown) via the pixel electrode is adjusted so that the light can be transmitted toward the common electrode substrate 2000. Accordingly, a wide viewing angle can be implemented, and a side visibility distortion phenomenon due to side gray level rounding or reversion can be relieved.

FIGS. 6 to 13 are views sequentially illustrating processes of fabricating the TFT substrate according to an exemplary embodiment of the present invention.

FIGS. 6, 8, 10 and 12 are plan views, and FIGS. 7, 9, 11 and 13 are sectional views of the TFT substrate taken along lines V-V, W-W, X-X, Y-Y and Z-Z, which correspond to the respective plan views.

Figure 6:
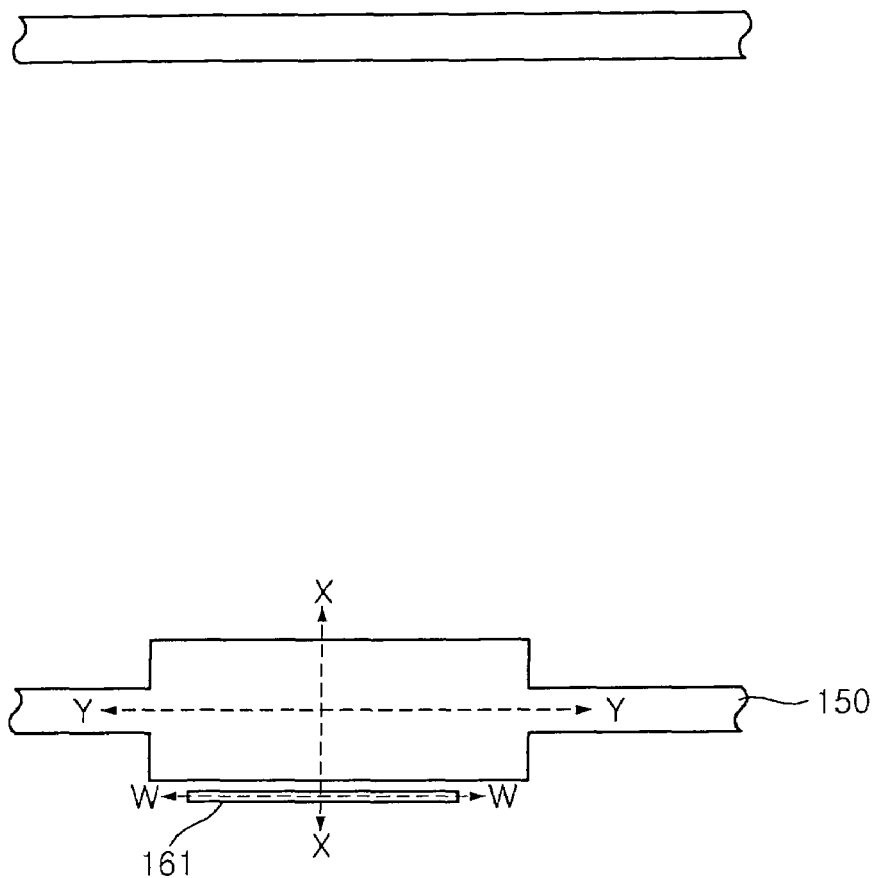
FIGS. 6 to 13 are views sequentially illustrating processes of fabricating the TFT substrate according to an exemplary embodiment of the present invention.
Figure 6:
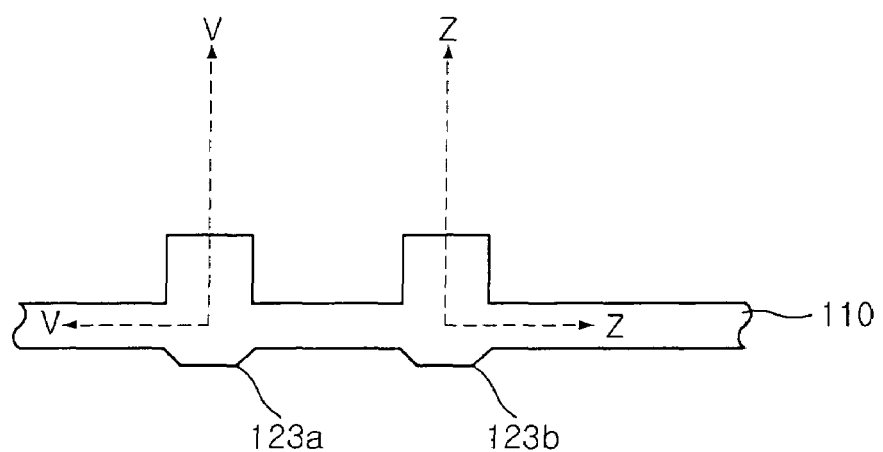
Figure 7:
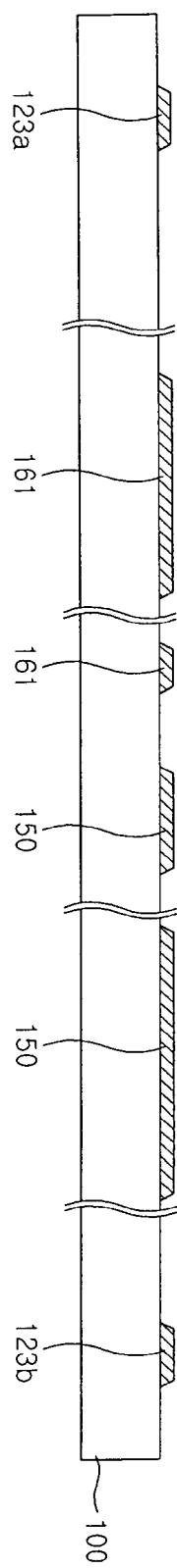

Referring to FIGS. 6 and 7, a first conductive film is formed on a transparent insulative substrate 100. Gate lines 110, first and second gate electrodes 123a and 123b, storage electrode lines 150 and repair lines 161 are then formed on the transparent insulative substrate 100 by means of photolithography using a first photosensitive mask pattern (not shown).

The first conductive film is formed on the transparent insulative substrate 100 by means of a deposition method such as CVD, PVD or sputtering. At least any one of Cr, MoW, Cr/Al, Cu, Al(Nd), Mo/Al, Mo/Al(Nd), Cr/Al(Nd) and Mo/Al/Mo may be used for the first conductive film. It is to be understood that the first conductive film is not limited to the materials mentioned above, but may be made of at least any one metal of Al, Nd, Ag, Cr, Ti, Ta and Mo, or an alloy thereof, and also formed as a single or multiple layer. The first conductive film may be formed as a double or triple layer including a metal layer of Cr, Ti, Ta or Mo with superior physicochemical properties, and an Al or Ag based metal layer with low specific resistivity. After the first conductive film has been formed on the entire substrate in such a manner, a photosensitive film (photo-resist film) is applied thereon, and a lithography process is then performed using a first mask so that a first photosensitive mask pattern can be formed. The plurality of gate lines 110, the first and second gate electrodes 123a and 123b, the storage electrode lines 150 horizontally extending in correspondence with the gate lines 110, and the repair lines 161 horizontally extending close to the storage electrode lines may be formed by performing an etching process using the first photosensitive mask pattern as an etching mask, as shown in FIG. 6. Thereafter, the first photosensitive mask pattern is removed by performing a predetermined stripping process.

Figure 8:
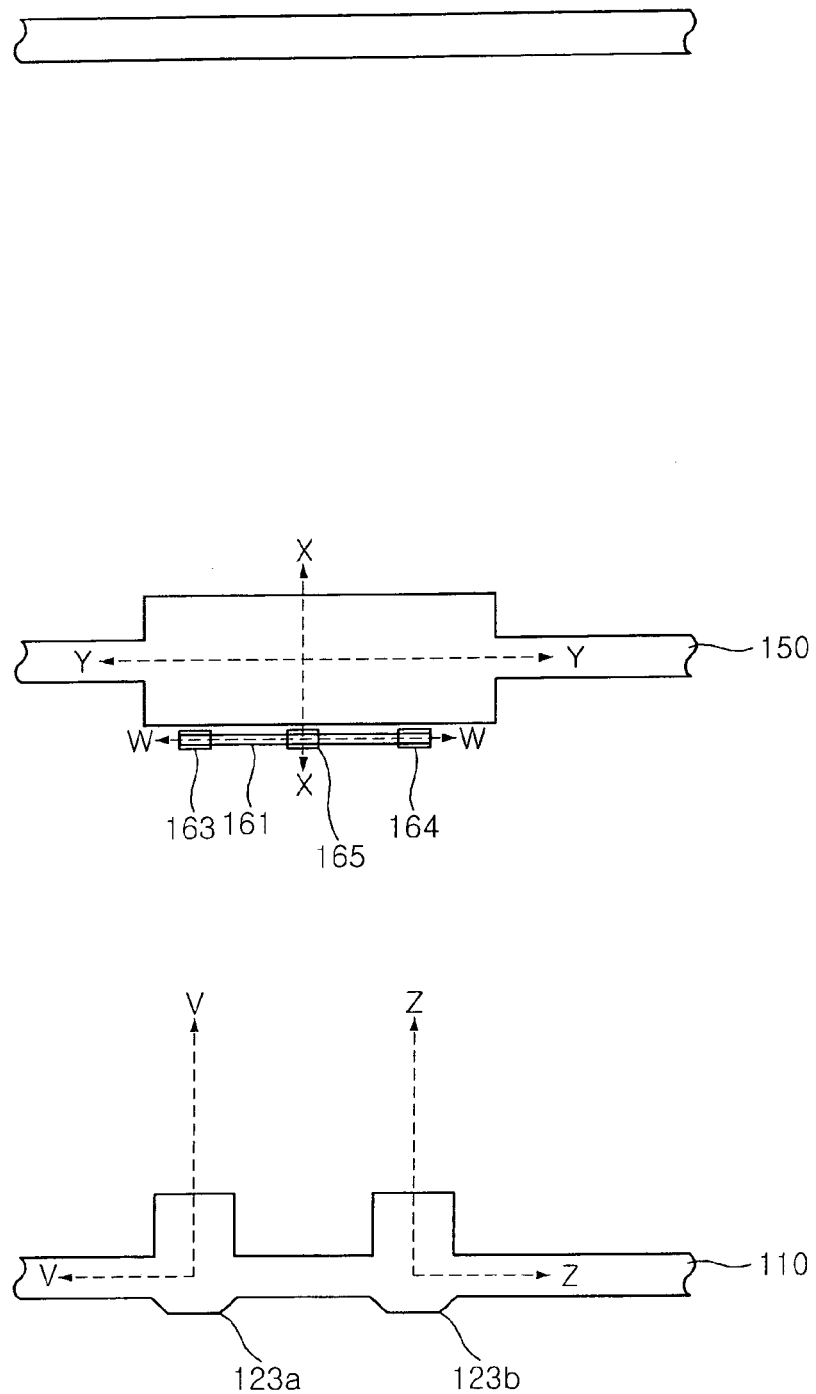
Figure 9:
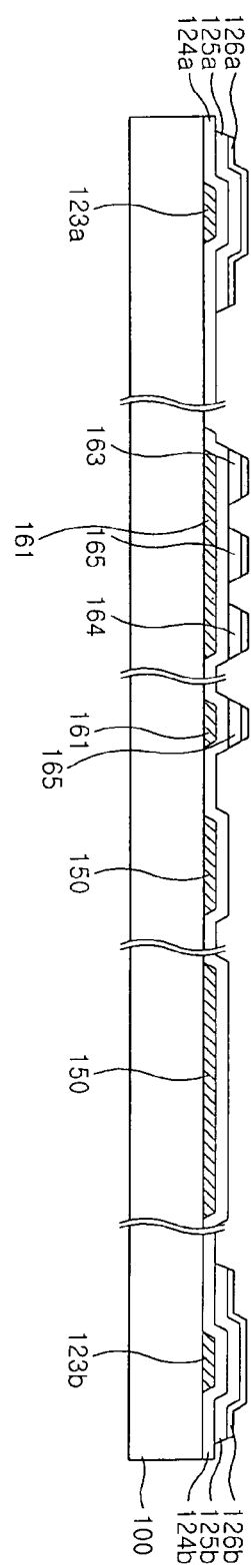

Referring to FIGS. 8 and 9, a gate insulation film 124, a thin film for an active layer and a thin film for an ohmic contact layer are sequentially formed on the entire structure, and an etching process is then performed using a second photosensitive mask pattern (not shown) so that active areas of first and second TFTs respectively including active layers 125a and 125b and ohmic contact layers 126a and 126b, and first to third repair pads 163, 164 and 165 can be formed.

The gate insulation film 124 is formed on the entire substrate by means of a deposition method such as PECVD or sputtering. An inorganic insulative substance such as silicone oxide or silicone nitride may be used for the gate insulation film 124. The thin film for an active layer and the thin film for an ohmic contact layer are sequentially formed on the gate insulation film 124 by means of the aforementioned deposition method. An amorphous silicon layer is used as the thin film for an active layer, and a silicide layer or an amorphous silicon layer doped with highly concentrated N-type impurities is used as the thin film for an ohmic contact layer.

A photosensitive film is applied to the thin film for an ohmic contact layer, and the second photosensitive mask pattern is formed through a photolithography process using a second mask. Active areas including the ohmic contact layers 126a and 126b and active layers 125a and 125b are respectively formed on the first and second gate electrodes 123a and 123b by performing an etching process using the second photosensitive mask pattern as an etching mask and the gate insulation film 124 as an etching stop film. Further, the first and second repair pads 163 and 164 are formed to partially overlap with both edges of the repair line 161, and the third repair pad 165 is formed to partially overlap with a central portion of the repair line 161. The first to third repair pads 163, 164 and 165 include the thin film for an active layer and the thin film for an ohmic contact layer. Thereafter, the remainder of the second photosensitive mask pattern is removed by performing a predetermined stripping process. The gate insulation film 124a and 124b may be formed to have a thickness of about 500 to 5000 Å, the active layers 125a and 125b may be formed to have a thickness of about 300 to 2000 Å, and the ohmic contact layers 126a and 126b may be formed to have a thickness of about 100 to 600 Å.

Figure 10:
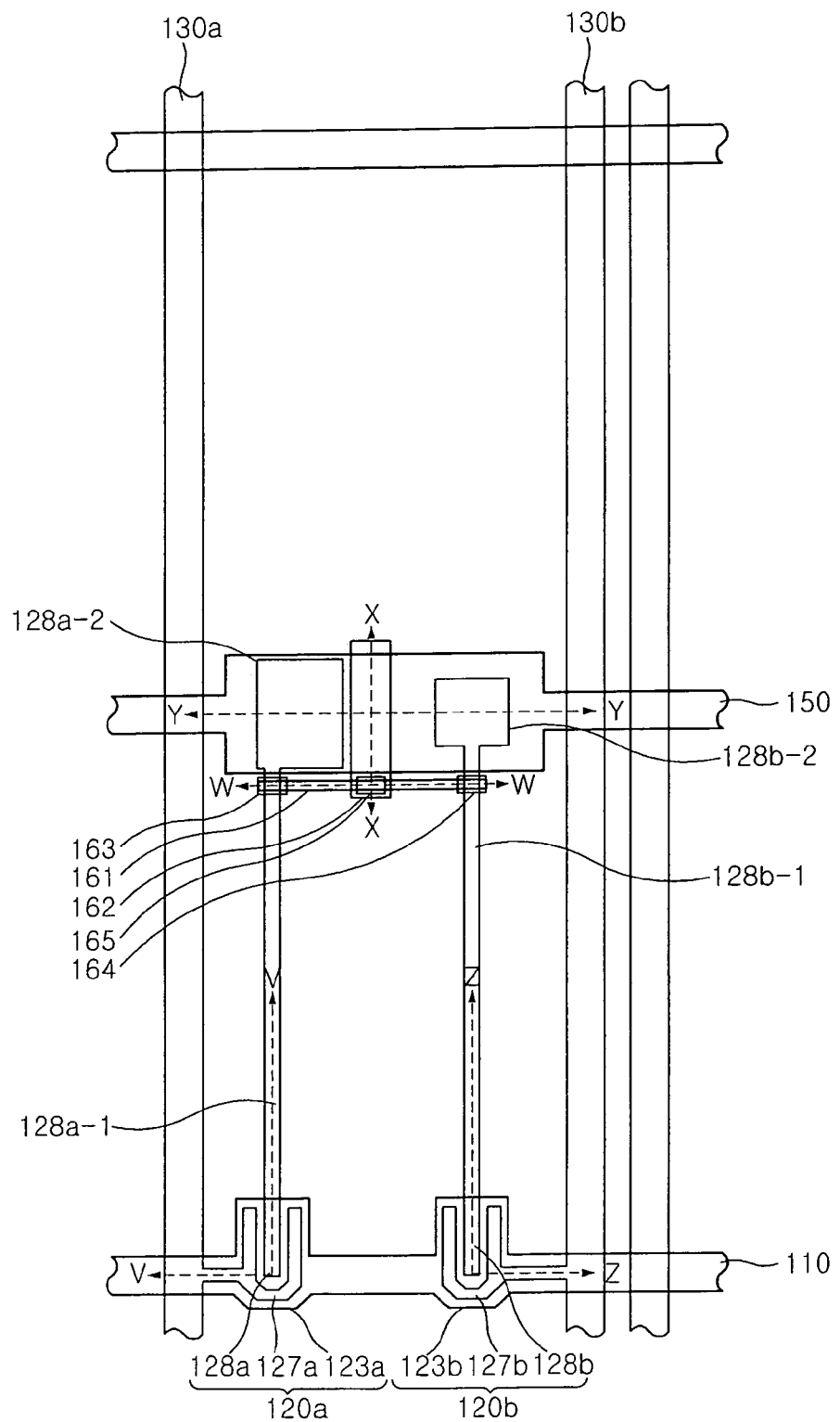
Figure 11:
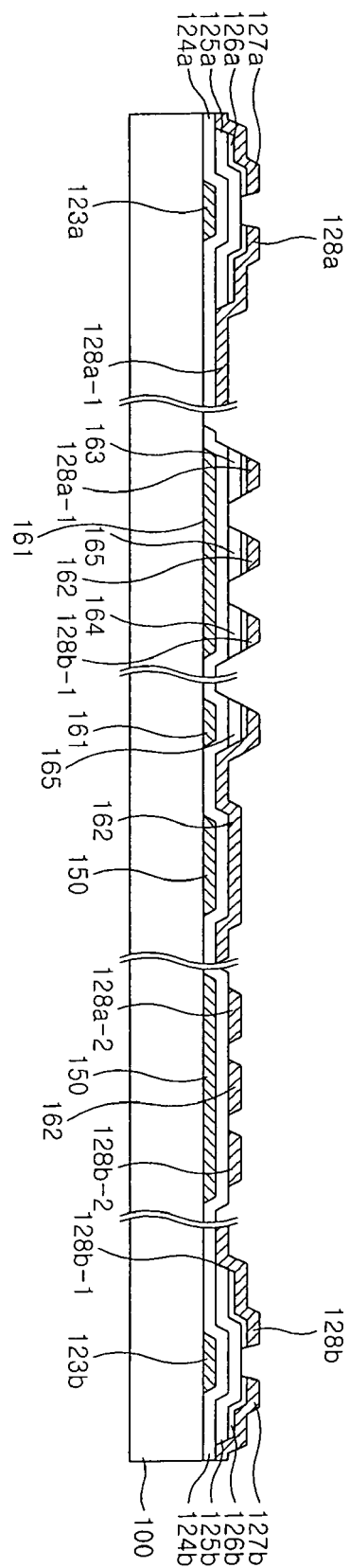

Referring to FIGS. 10 and 11, a second conductive film is formed on the entire structure in which the active regions of the first and second TFTs have been formed, and an etching process is then performed using a third photosensitive mask pattern (not shown) so that first and second data lines 130a and 130b, first and second source electrodes 127a and 127b, first and second drain electrodes 128a and 128b, first and second contact pads 128a-2 and 128b-2, and repair electrodes 162 can be formed on the entire structure.

The second conductive film is formed by means of a deposition method such as CVD, PVD or sputtering. A single metal layer made of at least one of Mo, Al, Cr and Ti, or a multiple layer thereof may be used as the second conductive film. It is to be understood that the second conductive film may be made of the same material as the first conductive film. The second conductive film may be deposited to have a thickness of about 500 to 3000 Å. Thereafter, a photosensitive film is applied to the second conductive film, and a lithography process is then performed using a third mask to form the third photosensitive mask pattern. The second conductive film is etched by performing an etching process using the third photosensitive mask pattern as an etching mask so that the first and second data lines 130a and 130b positioned at both sides of a pixel region perpendicular to the gate line 110 can be formed; the first and second source electrodes 127a and 127b and the first and second drain electrodes 128a and 128b, which are provided respectively on the first and second gate electrodes 123a and 123b, can be formed; the first and second contact pads 128a-2 and 128b-2, which partially overlap with the storage electrode line 150 and connected to the first and second drain electrodes 128a and 128b, respectively, can be formed; and the repair electrode 162 overlapping with the storage electrode line 150, the third repair pad 165 and the repair line 161 can be formed.

Thereafter, the ohmic contact layers 126a and 126b respectively exposed at regions between the source electrodes 127a and 127b and the drain electrodes 128a and 128b are removed by means of an etching process, so that the first and second TFTs 120a and 120b with channels formed of the active layers 126a and 126b between the source electrodes 127a and 127b and the drain electrodes 128a and 128b, respectively, can be formed.

The active layers 126a and 126b between the source electrodes 127a and 127b and the drain electrodes 128a and 128b may be exposed by removing the ohmic contact layers 126a and 126b without removing the third photosensitive mask pattern, or the ohmic contact layers 126a and 126b may be removed after the third photosensitive mask pattern is removed. In the etching process, the second conductive film in a region where the third photosensitive mask pattern is not formed, is first removed by performing a wet etching process, and the ohmic contact layers 126a and 126b are removed by performing a dry etching process. Further, the third photosensitive mask pattern may be removed by performing an ashing process using $O_2$ plasma between the wet and dry etching processes.

Figure 12:
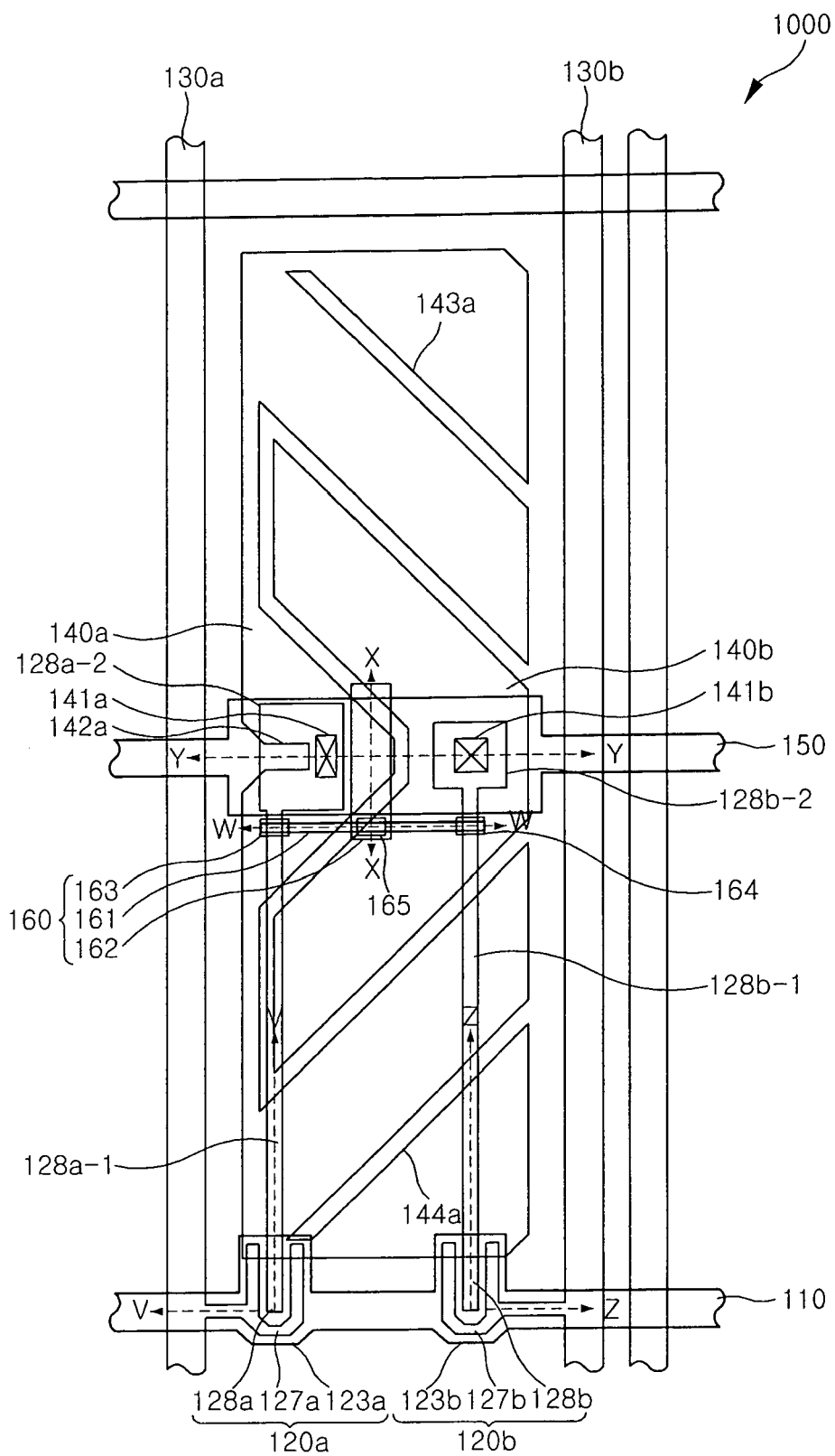
Figure 13:
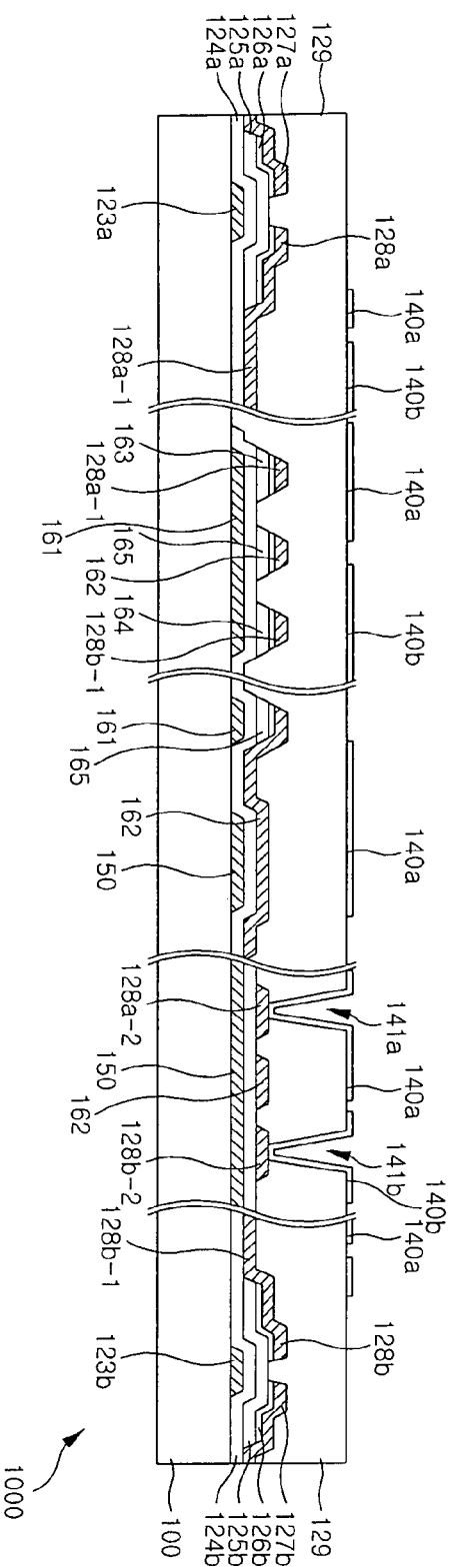

Referring to FIGS. 12 and 13, a protection film 129 is formed on the transparent insulative substrate 100 on which the gate lines 110, the first and data lines 130a and 130b, the first and second contact pads 128a-2 and 128b-2, the first and second TFTs 120a and 120b, and the repair electrodes 162 have been formed. Further, the protection film 129 is partially removed by means of an etching process using a fourth photosensitive mask pattern, so that contact holes for respectively exposing the first and second contact pads 128a-2 and 128b-2 can be formed.

A third conductive film is formed on the protection film 129 in which the contact holes are formed. The third conductive film is then patterned using a fifth photosensitive mask pattern (not shown), so that first and second contact plugs 141a and 141b respectively connected to the first and second contact pads 128a-2 and 128b-2 through the contact holes can be formed; first and second pixel patterns 140a and 140b respectively connected to the first and second contact plugs 141a and 141b can be formed; and a plurality of aperture patterns 142a, 143a and 144a can be formed in the first pixel pattern 140a. The third conductive film may be formed of a transparent conductive film including indium tin oxide (ITO) or indium zinc oxide (IZO). Two sub-pixels including the pixel patterns electrically insulated from each other are provided in a unit pixel defined by the gate lines and the first and second data lines through the aforementioned processes.

Accordingly, the first and second pixel patterns 140a and 140b are formed, and a first alignment film (not shown) is then formed on the entire structure, thereby fabricating a lower substrate, i.e., a TFT substrate.

A common electrode substrate 2000 is fabricated by sequentially forming a black matrix 210, a color filter 220, an overcoat film 230, protrusion patterns 241, 242, 243, 244 and 245, a transparent common electrode 240 and a second alignment film (not shown) on a second transparent insulative substrate 200.

Thereafter, spacers (not shown) are interposed between the TFT substrate 1000 and the common electrode substrate 2000, which have been fabricated as described above, and the substrates are joined together. Subsequently, a liquid crystal substance is injected into a predetermined space defined by the spacers using a vacuum injection method to form a liquid crystal layer, thereby fabricating an LCD according to an exemplary embodiment of the invention.

Although the TFT substrate 1000 can be formed through a process using five sheets of masks, it is not limited thereto, but may be formed through a process using more than or less than five sheets of masks.

A method of repairing the first and second sub-pixels according to an exemplary embodiment of the present invention based on the TFT substrate will be described. The first sub-pixel comprises the first TFT 120a and the first pixel pattern 140a. A first gray level voltage of the first data line 130a is applied to the first pixel pattern 140a via the first TFT 120a, and a voltage difference is generated between the first pixel pattern 140a and the common electrode 240 corresponding thereto so that liquid crystals on the first pixel pattern 140a can be driven. The second sub-pixel comprises the second TFT 120b and the second pixel pattern 140b. A second gray level voltage of the second data line 130b is applied to the second pixel pattern 140b via the second TFT 120a, and a voltage difference is generated between the second pixel pattern 140b and the common electrode 240 corresponding thereto so that the liquid crystals on the second pixel pattern 140b can be driven.

A peak value of the first gray scale voltage applied to the first data line 130a may be substantially identical to or smaller than that of the second gray scale voltage applied to the second data line 130b. Accordingly, a lower data signal, i.e., a lower gray scale voltage, is applied to the first pixel pattern 140a, and a higher data signal, i.e., a higher gray scale voltage, is applied to the second pixel pattern 140b.

In an exemplary embodiment of the invention, there are provided the repair portion 160 including the repair line 161 that partially overlaps with two lines, which are the extension lines 128a-1 and 128b-1 of the drain electrodes 128a and 128b for respectively connecting the first and second TFTs 120a and 120b to the first and second pixel pattern 140a and 140b, and the repair electrode 162 that partially overlaps with the repair line 161 and any one of the first and second pixel patterns 140a and 140b. If a failure occurs in a region of one sub-pixel within the unit pixel, a connection between the TFT and the pixel pattern of the sub-pixel in which the failure has occurred may be cut, and a laser beam may be radiated onto at least a portion of a region where the extension lines 128a-1 and 128b-1 of the drain electrodes 128a and 128b overlap with the repair line 161 and a region where the repair electrode 162 overlaps with the repair line 161 so as to make electrical connection between upper and lower lines or electrodes of the overlapped region, thereby repairing the first and second sub-pixels.

Figure 14:
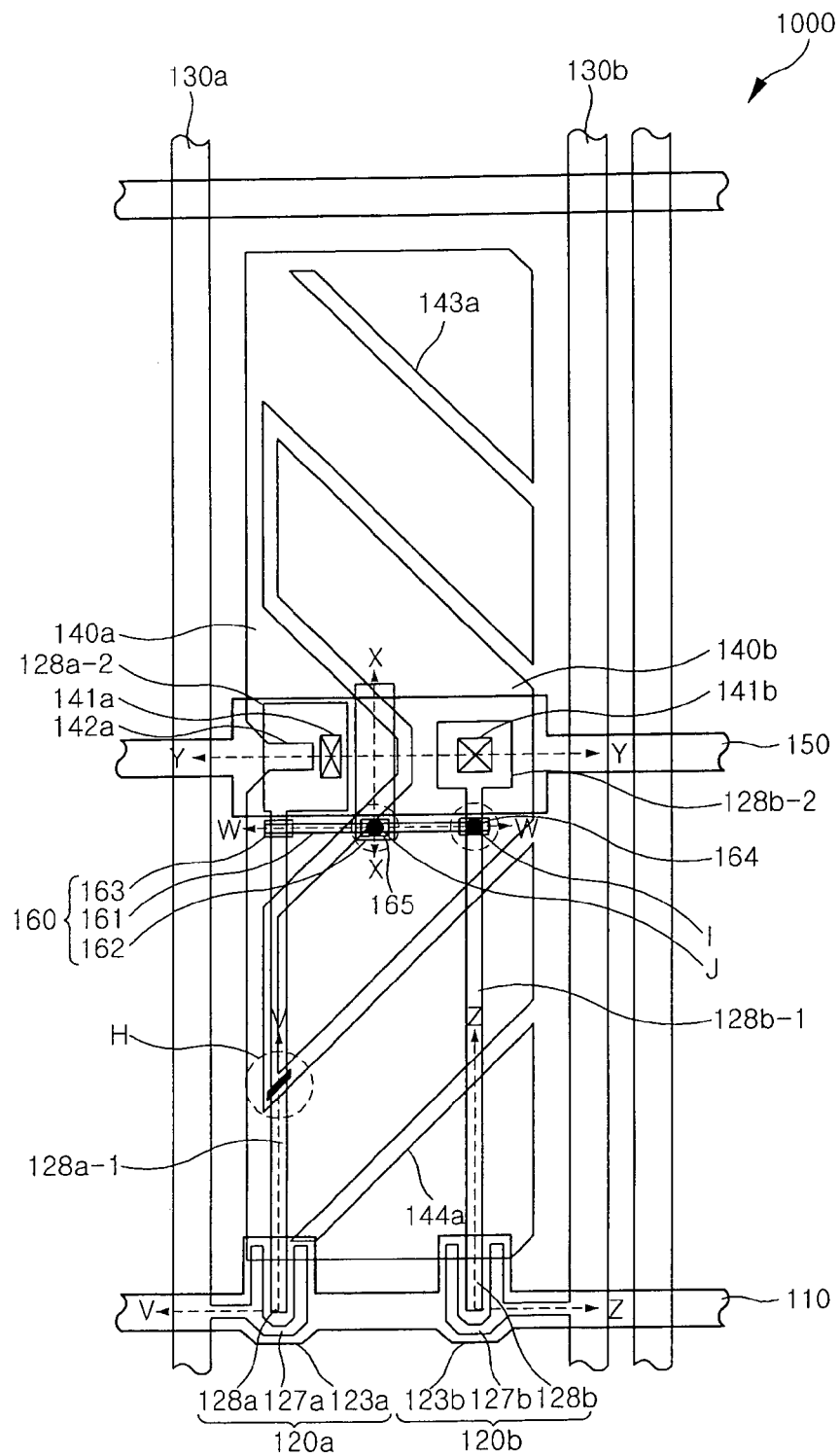
FIG. 14 is a plan view of an LCD illustrating a method of repairing one sub-pixel according to an exemplary embodiment of the present invention.
Figure 15:
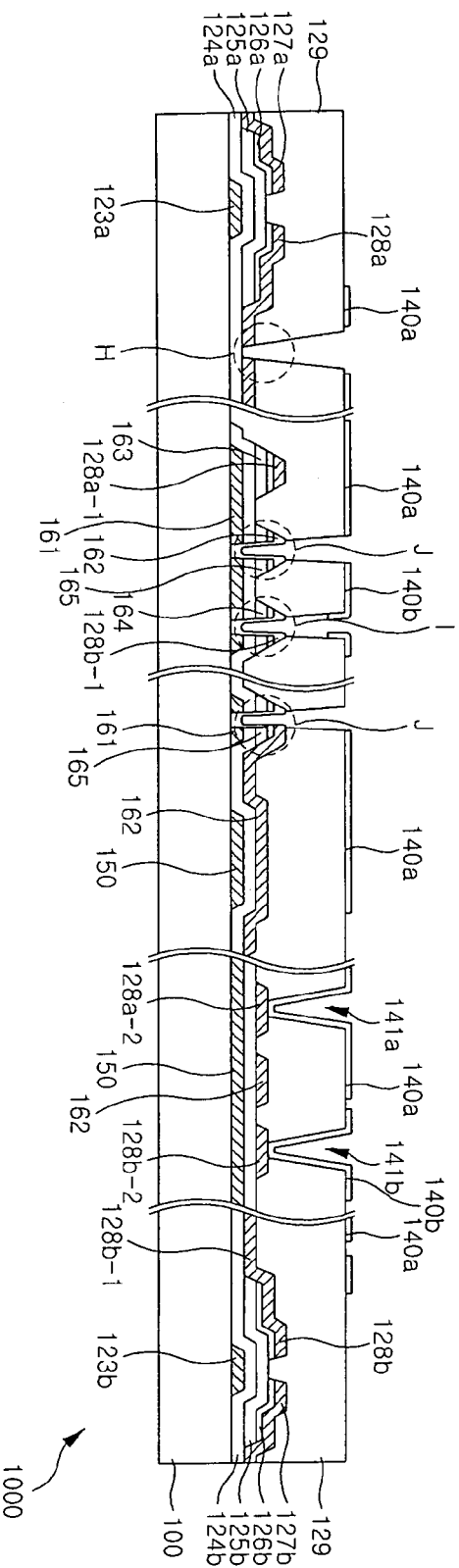
FIG. 15 is a sectional view of the LCD taken along lines V-V, W-W, X-X, Y-Y and Z-Z in FIG. 14.
Figure 16:
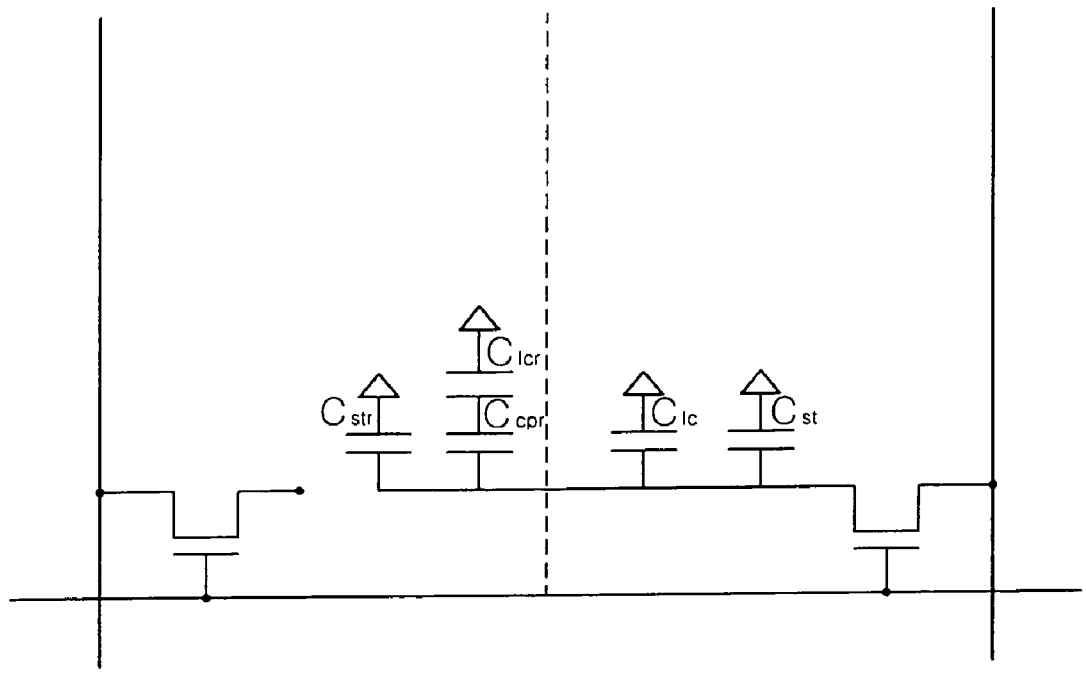
FIG. 16 is an equivalent circuit diagram of the LCD in FIG. 14 after repairing.

FIG. 14 is a plan view of an LCD illustrating a method of repairing one sub-pixel according to an exemplary embodiment of the present invention. FIG. 15 is a sectional view of the LCD taken along lines V-V, W-W, X-X, Y-Y and Z-Z in FIG. 14. FIG. 16 is an equivalent circuit diagram of the LCD in FIG. 14 after repairing.

Referring to FIGS. 14 to 16, when a defect is produced in the unit pixel due to a failure in the first TFT 120a of the first sub-pixel to which a lower data signal, i.e., a low gray scale voltage, is applied, a connection between the first TFT 120a and the first pixel pattern 140a is opened. A portion of the extension line 128a-1 of the first drain electrode 128a in the first TFT 120a connected to the first pixel pattern 140a through the first contact pad 128a-2 may be cut by means of a first laser repairing process (see region H in FIG. 14 or 15). The region where the extension line 128a-1 is cut may be provided in a region where the first and second pixel patterns 140a and 140b have not been formed (e.g., a aperture pattern region or a region between the first and second pixel patterns), thereby alleviating a problem in which a groove is formed in the first and second pixel patterns 140a and 140b at an upper side of the extension line upon irradiation of a laser, or electrical connection is made between the extension line and the pixel patterns. It is to be understood that the location of the cut is not limited thereto, but any portion of the extension line may be cut.

Thereafter, electrical connection is made between the second drain electrode 128b of the second TFT 120b and the repair line 161, and electrical connection is also made between the repair electrode 162 and the repair line 161. In an exemplary embodiment of the invention, a second laser repairing process is performed by radiating a laser beam onto a region where the extension line 128b-1 of the second drain electrode 128b of the second TFT 120b and the repair line 161 overlap with each other so that electrical connection can be made between the extension line 128b-1 of the second drain electrode 128b and the repair line 161 (see region I in FIG. 14 or 15), and a third laser repairing process is performed by radiating a laser beam onto a region where the repair electrode 162 and the repair line 161 overlap with each other so that electrical connection can be made between the repair electrode 162 and the repair line 161 (see region J in FIG. 14 or 15).

The description above is made in connection with a repairing process in which a laser repairing apparatus is positioned above the TFT substrate 1000, and a laser beam is radiated from above the TFT substrate 1000. However, a repairing process may be performed in such a manner that after the common electrode substrate 2000 and the TFT substrate 1000 are joined together, a laser beam is radiated from below the TFT substrate 1000. That is, the laser beam is radiated from below the TFT substrate 1000 so that a portion of the extension line 128a-1 of the first drain electrode 128a in the first TFT 120a can be cut, the second drain electrode 128b can be connected to the repair line 161, and the repair line 161 can be connected to the repair electrode 162.

As described above, repair is achieved by performing the laser repairing process three times. This results in a productivity improvement of 50% due to a reduction from 6 uses of the laser repairing process for a conventional repairing process to 3 here. Further, through the repairing process, the entire unit pixel is not rendered into an off-pixel and a voltage lower than that applied to the second sub-pixel can be applied to the first sub-pixel.

The first and second sub-pixels, according to an exemplary embodiment of the present invention, include pixel capacitors Clc provided between the first and second pixel patterns 140a and 140*b* and the common electrode 240, and storage capacitors Cst provided between the first and second pixel patterns 140*a* and 140*b* and the storage electrode line 150, respectively. However, if the repairing process is performed where a failure occurs in the first sub-pixel, the first pixel pattern 140*a* is floated, and the second drain electrode 128*b* of the second TFT 120*b* is connected to the repair electrode 162 through the repair line 161.

Accordingly, in the repaired first sub-pixel, a repair compensation capacitor Ccpr is provided between the repair electrode 162 and the floated first pixel pattern 140*a*, a repair pixel capacitor Clcr is provided between the floated first pixel pattern 140*a* and the common electrode 240, and the storage capacitor Cst is provided between the repair electrode 162 and the storage electrode line 150. The repair compensation capacitor Ccpr and the repair pixel capacitor Clcr are connected in series to each other, and ends thereof are connected to the second drain electrode 128*b* of the second sub-pixel.

If the second TFT 120*b* is turned on, a higher gray scale voltage of the second data line 130*b* is applied to the second pixel pattern 140*b* and the repair electrode 162 via the second drain electrode 128*b* at substantially the same time. The higher gray scale voltage applied to the second pixel pattern 140*b* is applied to the pixel capacitor Clc so that the second sub-pixel can be operated under the higher gray scale voltage. The higher gray scale voltage applied to the repair electrode 162 is lowered by the repair compensation capacitor Ccpr, and the lowered gray scale voltage is applied to the repair pixel capacitor Clcr. As a result, the first sub-pixel can be operated under a gray scale voltage lower than the higher gray scale voltage applied to the second sub-pixel. Accordingly, a visibility improvement effect can be equally maintained, and the first sub-pixel in which a failure has occurred can be operated at the entire gray level. The area of the repair electrode 162 overlapping with the first pixel pattern 140*a* may be adjusted to freely control a voltage value applied to both ends of the repair compensation capacitor Ccpr and the repair pixel capacitor Clcr. The size of the repair electrode 162 may be adjusted to achieve the best visibility index of the unit pixel.

Figure 17:
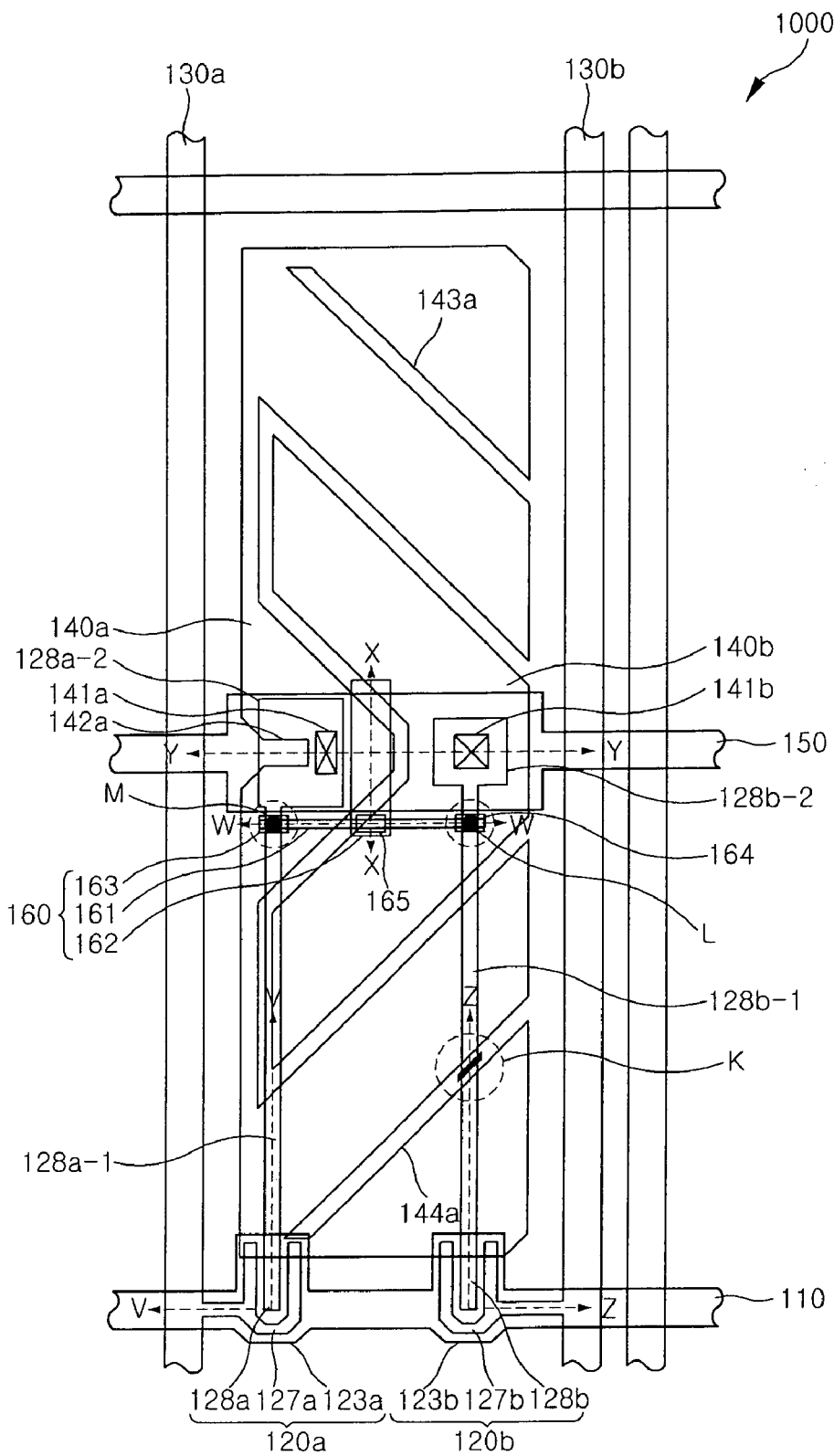
FIG. 17 is a plan view of an LCD illustrating a method of repairing one sub-pixel according to an exemplary embodiment of the present invention.
Figure 18:
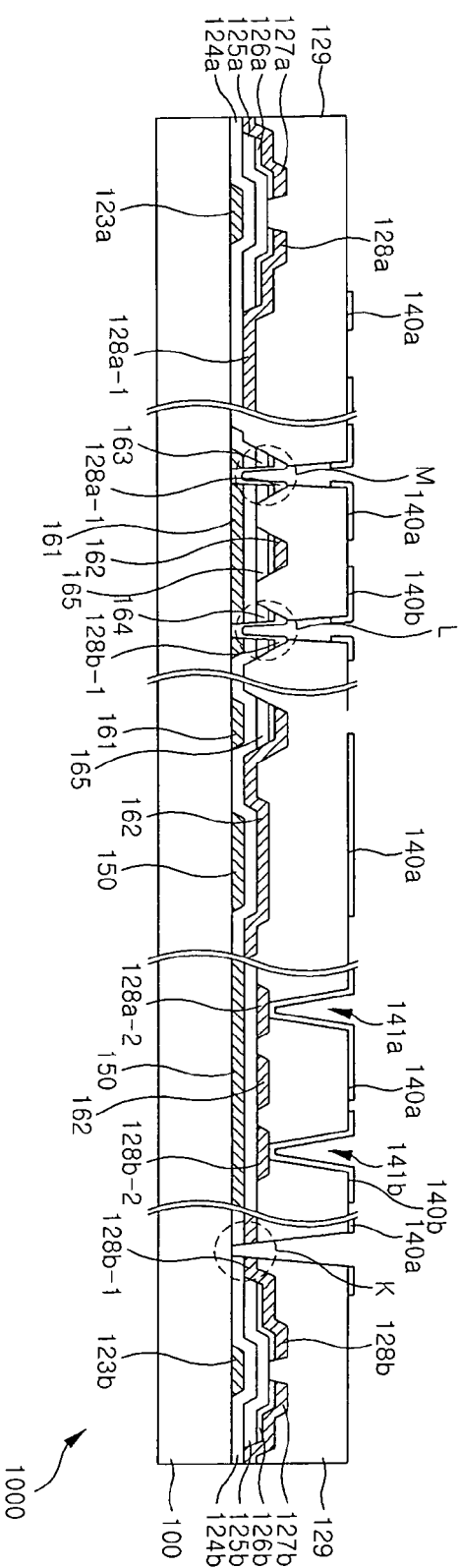
FIG. 18 is a sectional view of the LCD taken along lines V-V, W-W, X-X, Y-Y and Z-Z in FIG. 17.

FIG. 17 is a plan view of an LCD illustrating a method of repairing one sub-pixel according to an exemplary embodiment of the present invention. FIG. 18 is a sectional view of the LCD taken along lines V-V, W-W, X-X, Y-Y and Z-Z in FIG. 17 FIG. 19 is an equivalent circuit diagram of the LCD in FIG. 17 after repairing.

Figure 19:
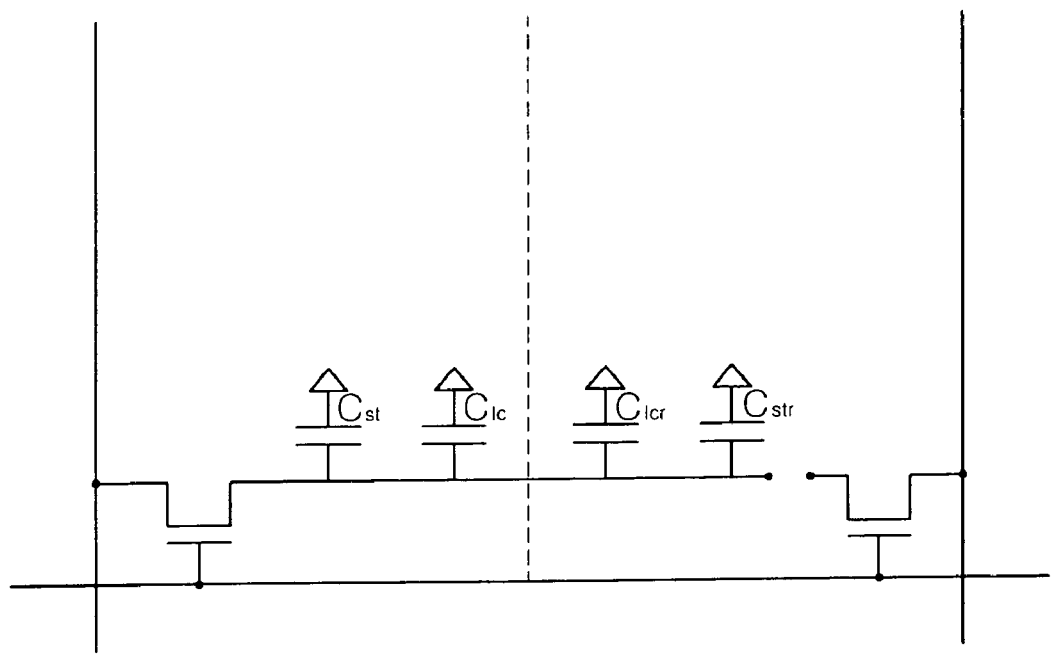
FIG. 19 is an equivalent circuit diagram of the LCD in FIG. 17 after repairing.

Referring to FIGS. 17 to 19, when a defect is produced in the unit pixel due to a failure in the second TFT 120*b* of the second sub-pixel to which a higher data signal, i.e., a higher gray scale voltage, is applied, a connection between the second TFT 120*b* and the second pixel pattern 140*b* is opened. A portion of the extension line 128*b*-1 of the second drain electrode 128*b* in the second TFT 120*a* connected to the second pixel pattern 140*b* through the second contact pad 128*b*-2 may be cut by means of a first laser repairing process (see region K in FIG. 17 or 18).

Thereafter, electrical connection is made between the second pixel pattern 140*b* and the repair line 161, and electrical connection is also made between the first drain electrode 128*a* of the first TFT 120*a* and the repair line 161.

The second pixel pattern 140*b* is connected to the second contact pad 128*b*-2, and the second contact pad 128*b*-2 is connected to the extension line 128*b*-1 of the second drain electrode 128*b*. A second repairing process is performed by radiating a laser beam onto a region where the extension line 128*b*-1 connected to the second contact pad 128*b*-2 and the repair line 161 overlap with each other so that electrical connection can be made between the extension line 128*b*-1 and the repair line 161 (see region L in FIG. 17 or 18). Accordingly, the repair line 161 is connected to the second pixel pattern 140*b* through the extension line 128*b*-1 and the second contact pad 128*b*-2. Further, a third laser repairing process is performed by radiating a laser beam onto a region where the extension line 128*a*-1 of the first drain electrode 128*a* of the first TFT 120*a* and the repair line 161 overlap with each other so that electrical connection can be made between the extension 128*a*-1 of the first drain electrode 128*a* and the repair line 161 (see region M in FIG. 17 or 18).

When the repairing process described above is performed due to a failure occurring in the second sub-pixel to which a higher gray scale voltage is applied, both the first and second pixel patterns 140*a* and 140*b* are connected to the first drain electrode 128*a* of the first TFT 120*a*. Accordingly, storage and pixel capacitors Cst and Clc of the first sub-pixel and repair storage and repair pixel capacitors Cstr and Clcr of the second sub-pixel are driven at the same voltage level as shown in FIG. 19. That is, both the first and second sub-pixels are operated under a lower gray scale voltage. Since there is a large difference in luminance between sub-pixels in a conventional case, a repairing process is performed such that an entire unit pixel becomes off. However, where the unit pixel comprising the first and second sub-pixels is driven by a lower gray scale voltage, there is little if any luminance difference. Further, since the entire unit pixel in which a failure occurs becomes off regardless of a gray level in the conventional case, the defective pixel is shown as a black point instead of full white. On the contrary, since the unit pixel repaired according to an exemplary embodiment of the present invention becomes off at a lower gray level of which brightness is low, there is little difference in luminance between the unit pixel and ambient pixels with lower gray levels. Further, at a higher gray level, e.g., full white, the repaired pixel normally operates to emit the full white. Therefore, there is no difference in luminance.

While the present invention has been described in connection with the preferred embodiments, it will be understood by those skilled in the art that various modifications and changes can be made thereto without departing from the spirit and scope of the invention defined by the appended claims.

What is claimed is:

1. A liquid crystal display (LCD), comprising:
   first and second switching elements connected to a first signal line;
   a signal line pair including a second and a third signal line connected to the first and second switching elements, respectively;
   a first pixel pattern connected through a first connection terminal of the first switching element;
   a second pixel pattern connected through a second connection terminal of the second switching element;
   a storage electrode line overlapping with the first and second pixel patterns; and
   a repair portion for electrically connecting the first and second pixel patterns to each other,
   wherein the repair portion comprises:
      a repair line partially overlapping with the first and second connection terminals, respectively; and
      a repair electrode overlapping with the repair line and any one of the first and second pixel patterns.

2. The LCD as claimed in claim 1, wherein the repair line is formed to take the shape of a straight line extending in the same direction as the storage electrode line, and overlaps with the first and second connection terminals at both ends of the straight line.

3. The LCD as claimed in claim 1, wherein the repair line is formed on the same plane as the storage electrode line and insulated from the first and second connection terminals by a first insulation film.

4. The LCD as claimed in claim 3, wherein the repair electrode is formed on the same plane as the first and second connection terminals; and
the repair electrode is insulated from the storage electrode line and the repair line by the first insulation film and from the first pixel pattern and the second pixel pattern by a second insulation film.

5. The LCD as claimed in claim 1, wherein the repair line is provided between the first signal line and the storage electrode line.

6. The LCD as claimed in claim 1, wherein the repair electrode is formed to take the shape of a plate that partially overlaps with the storage electrode line and also overlaps with the repair line at one end of the plate.

7. The LCD as claimed in claim 1, further comprising first and second repair pads provided in overlapped regions of the repair line with the first and second connection terminals, respectively, and a third repair pad provided in an overlapped region of the repair line with the repair electrode.

8. The LCD as claimed in claim 1, wherein the first connection terminal includes a first contact pad provided on the storage electrode line to connect the first pixel pattern, and the second connection terminal includes a second contact pad provided on the storage electrode line to connect to the second pixel pattern; and
the repair electrode is provided at a region between the first and second contact pads.

9. The LCD as claimed in claim 1, wherein the first and second connection terminals extend in the same direction.

10. The LCD as claimed in claim 1, wherein a peak value of a voltage applied to the second signal line is lower than or substantially identical to that of a voltage applied to the third signal line.

11. A method of fabricating an LCD, comprising the steps of:
forming a first signal line, a storage electrode line and a repair line;
forming first and second switching elements connected to the signal line;
forming a signal line pair including a second and third signal line connected to the first and second switching elements respectively;
forming first and second connection terminals on the first and second switching elements respectively;
forming a repair electrode that partially overlaps with the repair line;
forming a first insulation layer to insulate the repair line from the first and second connection terminals; forming a second insulation film; and
forming first and second pixel patterns to connect to the first and second connection terminals through the second insulation film, respectively, and to partially overlap with the storage electrode line, and causing one of the first and second pixel patterns to overlap with the repair electrode.

12. The method as claimed in claim 11, further comprising the step of forming an active layer on the first and second connection terminals and forming a repair pad on at least a portion of the repair line.

13. The method as claimed in claim 11, wherein each of the first and second connection terminals is formed to partially overlap with the repair line.

14. The method as claimed in claim 11, wherein the repair electrode is formed to partially overlap with the storage electrode line.

15. The method as claimed in claim 11, wherein the first and second connection terminals include first and second contact pads connected to the first and second pixel patterns, respectively, and the first and second contact pads are formed on the storage electrode line.

16. The method as claimed in claim 15, wherein the repair electrode is formed at a region between the first and second contact pads.

17. A method of repairing an LCD including first and second switching elements connected to a first signal line, a signal line pair including a second and third signal line connected to the first and second switching elements, respectively, a first pixel pattern connected through a first connection terminal of the first switching element, a second pixel pattern connected through a second connection terminal of the second switching element, a storage electrode line overlapping with the first and second pixel patterns, a repair line partially overlapping with the first and second connection terminals, respectively, and a repair electrode overlapping with the repair line and any one of the first and second pixel patterns, the method comprising the steps of:
cutting any one of the first and second connection terminals to form a cut connection terminal and an uncut connection terminal;
connecting the uncut connection terminal to the repair line; and
connecting the repair electrode and one of the first and second pixel patterns which had been connected to the cut connection terminal, to the repair line.

18. The method as claimed in claim 17, wherein the repair line is provided between the signal line and the storage electrode line, first and second connection lines extend from the first and second switching elements to an upper side of the storage electrode line, and wherein cutting one of the first and second connection terminals comprises using a laser beam to radiate onto a region between the repair line and the signal line.

19. The method as claimed in claim 18, wherein at least any one of the first and second pixel patterns includes an aperture pattern, and the cut connection terminal is cut in the aperture pattern or in a space between the first and second pixel patterns.

20. The method as claimed in claim 17, wherein a laser beam is radiated onto an overlapped region of the uncut connection terminal with the repair line and an overlapped region of the repair electrode with the repair line, so that the uncut connection terminal, the repair line and the repair electrode in the overlapped region are connected to one another.

21. The method as claimed in claim 17, wherein a laser beam is radiated onto an overlapped region of the cut connection terminal with the repair line, so that a pixel pattern of the first and second pixel patterns connected to the cut connection terminal is connected to the repair line.

22. The method as claimed in claim 17, wherein if a failure occurs in a region of the first switching element and the first pixel pattern overlaps with the repair electrode, the first connection terminal is cut, the second connection terminal is connected to the repair line, and the repair electrode is connected to the repair line; and
if a failure occurs in a region of the second switching element and the first pixel pattern overlaps with the repair electrode, the second connection terminal is cut, and the first and second connection terminals are connected to the repair line.

23. A thin film transistor (TFT) substrate, comprising:
first and second TFTs formed in a pixel region;
a gate line connected to the first and second TFTs;
first and second data lines connected to the first and second TFTs, respectively;
first and second drain electrodes for connecting the first and second TFTs to first and second pixel patterns, respectively;
a repair line partially overlapping with the first and second drain electrodes; and
a repair electrode overlapping with the repair line and one of the first and second pixel patterns.

24. The TFT substrate as claimed in claim 23, wherein the repair line is formed on the same plane as the gate line and insulated from the first and second drain electrodes by a gate insulation film.

25. The TFT substrate as claimed in claim 24, wherein the repair electrode is formed on the same plane as the first and second drain electrodes; and
the repair electrode is insulated from the repair line by the gate insulation film and from the overlapped pixel pattern by a TFT protection film.

26. The TET substrate as claimed in claim 23, further comprising a storage electrode line overlapping with the first and second pixel patterns and formed on the same plane as the gate line, wherein the repair line is provided between the storage electrode line and the gate line.

27. The TFT substrate as claimed in claim 26, wherein the repair electrode is formed to take the shape of a plate that partially overlaps with the storage electrode line.

28. The TFT substrate as claimed in claim 23, further comprising first and second repair pads provided at overlapping regions of the first and second drain electrodes with the repair line, respectively, and a third repair pad provided at an overlapping region of the repair electrode with the repair line.

* * * * *